United States Patent
Peng et al.

(10) Patent No.: US 11,302,695 B2
(45) Date of Patent: Apr. 12, 2022

(54) METHOD FOR FORMING INTEGRATED SEMICONDUCTOR DEVICE WITH 2D MATERIAL LAYER

(71) Applicant: TAIWAN SEMICONDUCTOR MANUFACTURING CO., LTD., Hsinchu (TW)

(72) Inventors: Cheng-Yi Peng, Taipei (TW); Chun-Chieh Lu, Taipei (TW); Meng-Hsuan Hsiao, Hsinchu (TW); Ling-Yen Yeh, Hsinchu (TW); Carlos H. Diaz, Los Altos Hills, CA (US); Tung-Ying Lee, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/940,258

(22) Filed: Jul. 27, 2020

(65) Prior Publication Data
US 2020/0358873 A1 Nov. 12, 2020

Related U.S. Application Data

(62) Division of application No. 16/133,028, filed on Sep. 17, 2018, now Pat. No. 10,727,230.
(Continued)

(51) Int. Cl.
*H01L 27/092* (2006.01)
*H01L 23/532* (2006.01)
(Continued)

(52) U.S. Cl.
CPC ........ *H01L 27/0924* (2013.01); *G06F 3/0481* (2013.01); *G06F 13/00* (2013.01);
(Continued)

(58) Field of Classification Search
CPC ............. H01L 27/0924; H01L 21/0228; H01L 21/76897; H01L 23/53295; H01L 23/5384;
(Continued)

(56) References Cited

U.S. PATENT DOCUMENTS

| 8,541,819 B1 * | 9/2013 | Or-Bach ........... H01L 21/76254 257/211 |
| 8,796,741 B2 * | 8/2014 | Gu ........................ H01L 27/092 257/211 |

(Continued)

OTHER PUBLICATIONS

Yu et al. "Metal-Semiconductor Phase-transtion in WSe2(1-x)Te2 Monolayer", Advanced Materials, (Year 2016).

*Primary Examiner* — Shahed Ahmed
(74) *Attorney, Agent, or Firm* — Maschoff Brennan

(57) ABSTRACT

In a method for forming an integrated semiconductor device, a first transistor over is formed on a substrate; an inter-layer dielectric (ILD) layer is deposited over the first transistor; a gate conductive layer is deposited over the ILD layer; a gate dielectric layer is deposited over the gate conductive layer; the gate dielectric layer and the gate conductive layer are etched to form a gate stack; and a 2D material layer that has a first portion extending along a top surface and sidewalls of the gate stack and a second portion extending along a top surface of the ILD layer.

20 Claims, 23 Drawing Sheets

Related U.S. Application Data

(60) Provisional application No. 62/592,991, filed on Nov. 30, 2017.

(51) Int. Cl.

| | | |
|---|---|---|
| *H01L 29/78* | (2006.01) | |
| *H01L 29/786* | (2006.01) | |
| *H01L 29/66* | (2006.01) | |
| *H01L 29/08* | (2006.01) | |
| *H01L 29/417* | (2006.01) | |
| *H01L 21/768* | (2006.01) | |
| *H01L 21/02* | (2006.01) | |
| *H01L 23/538* | (2006.01) | |
| *H01L 29/423* | (2006.01) | |
| *H01L 29/778* | (2006.01) | |
| *H01L 29/45* | (2006.01) | |
| *H01L 27/12* | (2006.01) | |
| *G06F 16/955* | (2019.01) | |
| *G06F 3/0481* | (2022.01) | |
| *G06F 13/00* | (2006.01) | |
| *H04L 29/06* | (2006.01) | |
| *H04L 67/303* | (2022.01) | |
| *H04L 67/306* | (2022.01) | |

(52) U.S. Cl.
CPC ...... *G06F 16/9554* (2019.01); *H01L 21/0228* (2013.01); *H01L 21/76897* (2013.01); *H01L 23/5384* (2013.01); *H01L 23/53295* (2013.01); *H01L 27/1248* (2013.01); *H01L 29/0847* (2013.01); *H01L 29/41733* (2013.01); *H01L 29/42356* (2013.01); *H01L 29/45* (2013.01); *H01L 29/66545* (2013.01); *H01L 29/66742* (2013.01); *H01L 29/778* (2013.01); *H01L 29/786* (2013.01); *H01L 29/7851* (2013.01); *H01L 29/78681* (2013.01); *H01L 29/78684* (2013.01); *H04L 63/0853* (2013.01); *H04L 67/303* (2013.01); *H04L 67/306* (2013.01); *H01L 29/41791* (2013.01); *H01L 2029/7858* (2013.01)

(58) Field of Classification Search
CPC ............. H01L 27/1248; H01L 29/0847; H01L 29/41733; H01L 29/42356; H01L 29/45; H01L 29/66545; H01L 29/66742; H01L 29/778; H01L 29/7851; H01L 29/786; H01L 29/78681; H01L 29/78684; H01L 29/41791; H01L 29/0665; H01L 29/78687; H01L 29/78696; H01L 29/0669–068; H01L 29/7853–2029/7858
See application file for complete search history.

(56) References Cited

U.S. PATENT DOCUMENTS

| | | |
|---|---|---|
| 2013/0082235 A1 | 4/2013 | Gu et al. |
| 2014/0367857 A1* | 12/2014 | Yang ................. H01L 21/76843 257/751 |
| 2016/0343805 A1 | 11/2016 | Lee et al. |
| 2016/0379901 A1 | 12/2016 | Lin et al. |
| 2017/0053908 A1 | 2/2017 | Hoffman |
| 2018/0122793 A1* | 5/2018 | Moroz ................ H01L 29/4238 |
| 2019/0019838 A1 | 1/2019 | Kropelnicki et al. |
| 2019/0058036 A1* | 2/2019 | Smith ............... H01L 29/66545 |
| 2019/0148376 A1* | 5/2019 | Chanemougame .......................... H01L 29/42372 257/532 |
| 2019/0194797 A1 | 6/2019 | Yu et al. |

* cited by examiner

METHOD FOR FORMING INTEGRATED SEMICONDUCTOR DEVICE WITH 2D MATERIAL LAYER

RELATED APPLICATIONS

This application is a divisional application of U.S. patent application Ser. No. 16/133,028 filed on Sep. 17, 2018, now U.S. Pat. No. 10,727,230 issued on Jul. 28, 2020, which claims priority to U.S. Provisional Application Ser. No. 62/592,991, filed Nov. 30, 2017, all of which are herein incorporated by reference.

BACKGROUND

The electronics industry has experienced an ever increasing demand for smaller and faster electronic devices which are simultaneously able to support a greater number of increasingly complex and sophisticated functions. Accordingly, there is a continuing trend in the semiconductor industry to manufacture low-cost, high-performance, and low power consumption integrated circuits (ICs). These goals have been achieved in large part by scaling down semiconductor IC dimensions (e.g., minimum feature size) and thereby improving production efficiency and lowering associated costs. Nevertheless, there are physical limits to the density that can be achieved in two dimensions for integrated circuits.

Three-dimensional (3D) stacking of semiconductor devices is one avenue to tackle these issues for further density. Technologies to construct 3D stacked integrated circuits or chips include 3D packaging, parallel 3D integration and monolithic 3D IC technologies. Among these technologies, the monolithic 3D IC technology exhibits the advantages of cost-effective, small area and high heterogeneous integration capability. However, the monolithic 3D IC technology has a critical problem, in which the process of forming the upper layer devices would be harmful to the lower layer devices due to its high thermal budget requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
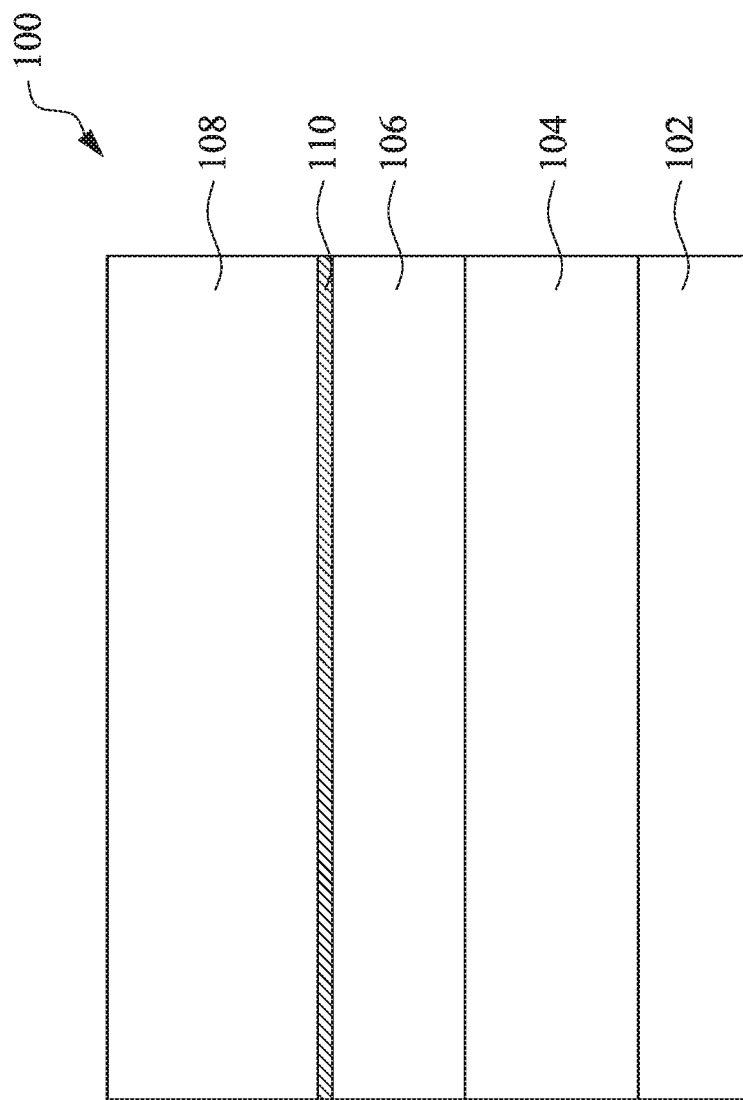
FIG. 1 is a schematic structural view of an integrated semiconductor device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Terms used herein are only used to describe the specific embodiments, which are not used to limit the claims appended herewith. For example, unless limited otherwise, the term "a," "an," "one" or "the" of the single form may also represent the plural form. In addition, the present disclosure may repeat reference numerals and/or letters in the various examples. This repetition is for the purpose of simplicity and clarity and does not in itself dictate a relationship between the various embodiments and/or configurations discussed. The spatially relative terms are intended to encompass different orientations of the device in use or operation in addition to the orientation depicted in the figures.

Further, spatially relative terms, such as "over," "on," "upper," "lower," "top," "bottom" as well as derivative thereof (e.g. "horizontally," "laterally," "underlying," etc.), may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Terms concerning electrical communications and the like, such as, "coupled" and "electrically coupled" or "electrically connected," refer to a relationship wherein nodes communicate with one another either directly or indirectly through intervening structures, unless described otherwise.

Embodiments of the present disclosure are directed to an integrated semiconductor device with a stack of semiconductor devices or structures. By introducing a 2D material layer in the integrated semiconductor device as a channel layer of one or more of the semiconductor devices or structures utilizing low thermal budget process(es), the integrated semiconductor device can be made by using low thermal budget based processes without sacrificing the performance or degrading the semiconductor devices or structures. A three-dimensional (3D) semiconductor device, such as a FinFET, a gate-all-around (GAA) transistor, etc., may be made as a part of the integrated semiconductor device, and thus integrating a 3D semiconductor device to form an integrated semiconductor device is realizable. Moreover, the 2D material is beneficial for high transistor speed and power efficiency of the integrated semiconductor device because of its high mobility characteristics.

FIG. 1 exemplarily illustrates a simplified cross-sectional view of an integrated semiconductor device 100 in accordance with some embodiments of the present disclosure. As shown in FIG. 1, the integrated semiconductor device 100 is a three-dimensional (3D) stacked semiconductor device, and in the integrated semiconductor device 100, a substrate 102 is shown, over which a semiconductor device 104, an inter-layer dielectric (ILD) layer 106 and a semiconductor device 108 are sequentially stacked.

The substrate 102 may be a semiconductor substrate, such as a bulk semiconductor substrate, a semiconductor-on-insulator (SOI) substrate, a multi-layered or gradient substrate, or the like. The substrate 102 may include a semiconductor material, such as an elemental semiconductor material including silicon or gallium, a compound or alloy semiconductor including silicon carbide, silicon-germanium, gallium arsenide, gallium phosphide, indium phosphide, indium antimonide, gallium arsenide phosphide, aluminum indium arsenide, aluminum gallium arsenide, gallium indium arsenide, indium arsenide, gallium indium phosphide, gallium indium arsenide phosphide, or a combination thereof, or another suitable semiconductor material. In some examples, the substrate 102 includes a crystalline silicon substrate, such as a wafer.

The semiconductor device 104 may have a transistor structure, such as planer field effect transistor (FET) structure, a FinFET structure, a GAA transistor structure or any other suitable structure that may made by adopting a gate first process flow or a gate last process flow.

The ILD layer 106 is interposed between the semiconductor device 104 and the semiconductor device 108. The ILD layer 106 may include one or more dielectric material of layers, which may include one or more dielectric materials, such as silicon oxide, silicon nitride, silicon oxynitride, tetraethoxysilane (TEOS), phosphosilicate glass (PSG), borophosphosilicate glass (BPSG), low-k dielectric material, and/or another suitable materials. Examples of a low-k dielectric material include, but is not limited to, fluorinated silica glass (FSG), carbon doped silicon oxide, amorphous fluorinated carbon, parylene, bis-benzocyclobutenes (BCB) or polyimide. The ILD layer 106 may have a thickness in a range from about 10 nm to about 100 nm for process tolerance concern, i.e., in order to avoid damaging to the underlying semiconductor device 104 during the formation of the subsequent element(s) over the ILD layer 106 (e.g. the semiconductor device 108).

The semiconductor device 108 may have a transistor structure, such as a planar FET structure, a thin film transistor (TFT) structure or any other suitable structure of front gate type or back gate type that may made by adopting a gate first process flow or a gate last process flow. In addition, the semiconductor device 108 includes a two-dimensional (2D) material layer 110. The 2D material layer 110 may be a monolayer that may include, for example, graphene, bismuth, hexagonal form boron nitride (h-BN), molybdenum sulfide, molybdenum selenide, tungsten, sulfide tungsten selenide, tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide, indium selenide, and/or the like. In some other embodiments, the 2D material layer 110 includes a ternary 2D material, such as $WSe_{2(1-x)}Te_{2x}$ (where x is in a range between 0 and 1), $Ta_2NiS_5$ or $ZnIn_2S_4$, a hybridized 2D material, such as a composition of boron nitride and graphene or a composition of molybdenum sulfide and rubrene. In the disclosure, the monolayer may be a one-molecule thick layer, a two-molecule thick layer, a three-molecule thick layer, or the like, depending on the material thereof. In some other embodiments, the 2D material layer 110 includes plural monolayers that may include the material(s) mentioned above. In a case where the semiconductor device 108 has a transistor structure, the 2D material layer 110 may be a part (i.e. a channel layer) of the transistor structure, which has high mobility characteristics and thus is beneficial for high transistor speed and power efficiency. The 2D material layer 110 may have a thickness in a range from about 10 angstroms to about 50 angstroms, in order to offer excellent electrostatic control of the channel layer of the transistor structure.

Hereinafter, some examples of the integrated semiconductor device 100 are described in more detail.

Figure 2A:
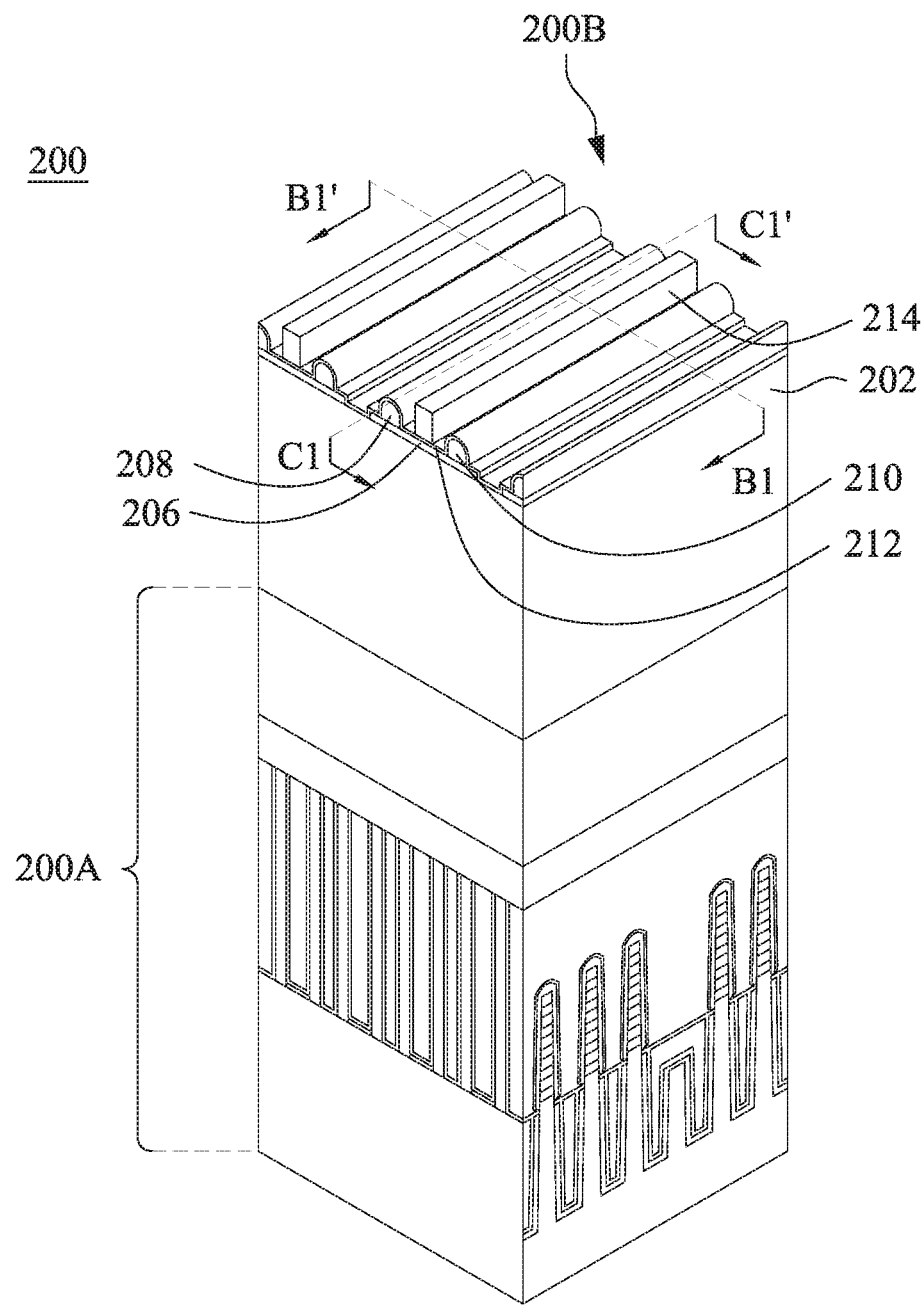
FIG. 2A exemplarily illustrates a schematic perspective view of an integrated semiconductor device in accordance with some embodiments of the present disclosure.
Figure 2B:
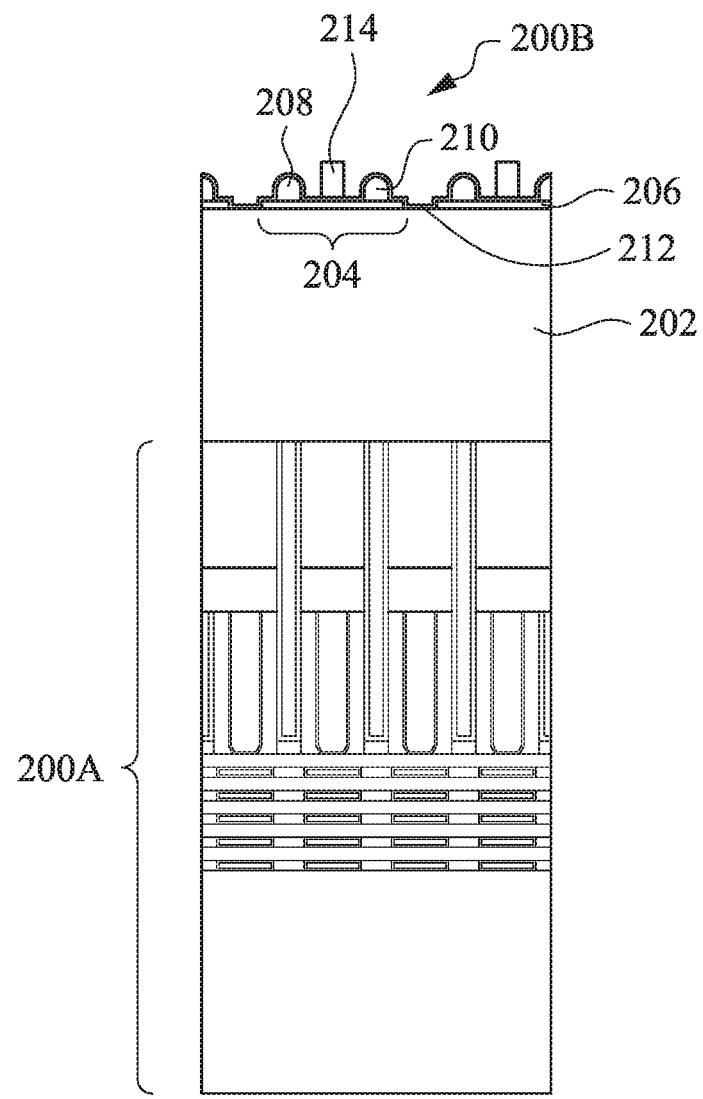
FIG. 2B is a schematic cross-sectional view of the integrated semiconductor device viewed along a B1-B1' line shown in FIG. 2A.
Figure 2C:
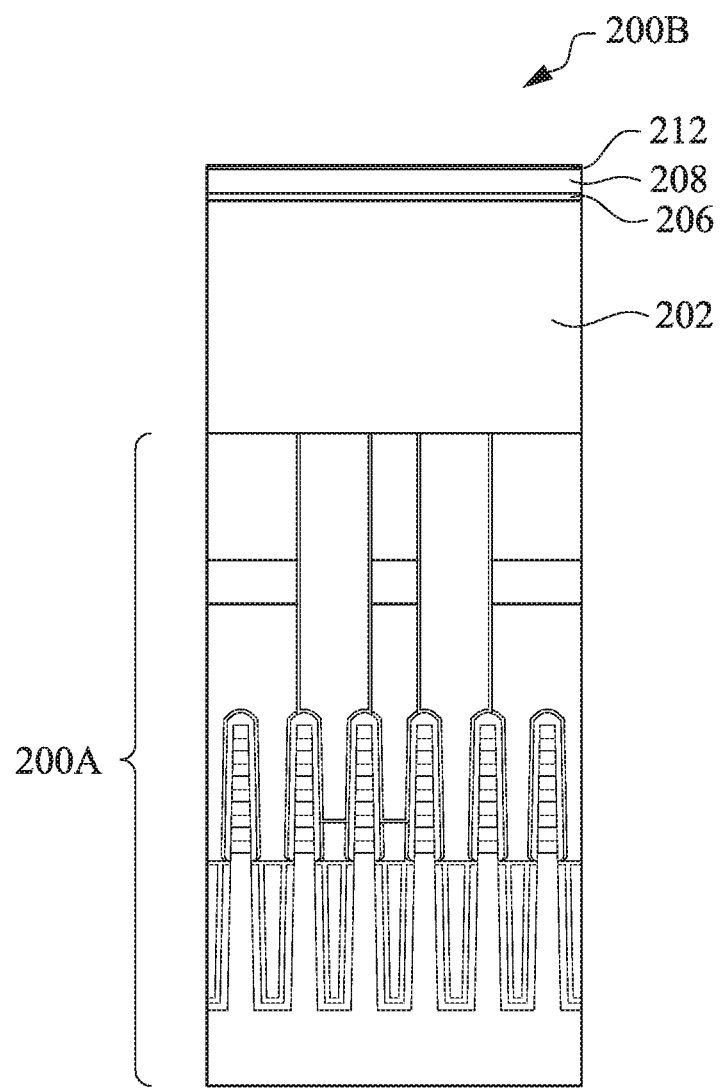
FIG. 2C is a schematic cross-sectional view of the integrated semiconductor device viewed along a C1-C1' line shown in FIG. 2A.

Referring to FIG. 2A to FIG. 2C, FIG. 2A exemplarily illustrates a schematic perspective view of an integrated semiconductor device 200 in accordance with some embodiments of the present disclosure, and FIG. 2B and FIG. 2C are schematic cross-sectional views of the integrated semiconductor device 200 viewed along a B1-B1' line and a C1-C1' line in FIG. 2A, respectively.

The integrated semiconductor device 200 includes a lower semiconductor device 200A and an upper semiconductor device 200B. In some embodiments, as shown in FIG. 2A to FIG. 2C, the lower semiconductor device 200A includes a FinFET structure. In various embodiments, the lower semiconductor device 200A may include a planar FET, a GAA transistor structure and/or any other suitable structure.

An ILD layer 202 is interposed between the lower semiconductor device 200A and the upper semiconductor device 200B. The ILD layer 202 may include one or more dielectric material of layers, which may include one or more dielectric materials, such as silicon oxide, silicon nitride, TEOS, PSG, BPSG, low-k dielectric material, and/or another suitable material. Examples of a low-k dielectric material include, but is not limited to, FSG, carbon doped silicon oxide, amorphous fluorinated carbon, parylene, BCB or polyimide. The ILD layer 202 may have a thickness in a range from about 10 nm to about 100 nm for process tolerance concern, i.e., in order to avoid damaging to the lower semiconductor device 200A due to subsequent elements change to subsequent processes for constructing the upper semiconductor device 200B.

In some embodiments, as shown in FIG. 2A and FIG. 2B, the upper semiconductor device 200B includes a planar FET structure. In some embodiments, the upper semiconductor device 200B may include a TFT structure or any other suitable structure of front gate type, back gate type or both.

The upper semiconductor device 200B may have plural transistor structures 204, in which a 2D material layer 206 of each transistor structure 204 is over the ILD layer 202 overlying the lower semiconductor device 200A as a channel layer of the transistor structure 204. Hereafter, only one transistor structure 204 is described for the sake of brevity. In some embodiments, the 2D material layer 206 is a monolayer that is formed from, for example, graphene, bismuth, hexagonal form h-BN, molybdenum sulfide, molybdenum selenide, tungsten, sulfide tungsten selenide, tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide, indium selenide, and/or the like. In some other embodiments, the 2D material layer 206 is formed from a ternary 2D material, such as $WSe_{2(1-x)}Te_{2x}$, (where x is in a range between 0 and 1), $Ta_2NiS_5$ or $ZnIn_2S_4$, a hybridized 2D material, such as a composition of boron nitride and graphene or a composition of molybdenum sulfide and rubrene. The 2D material layer 206 may have a thickness $T_{206}$ in a range from about 10 angstroms to about 50 angstroms, in order to offer excellent electrostatic control of the channel layer of the transistor structure 204. In some alternative embodiments, multiple 2D material layers 206 with the same or different 2D materials are formed over the ILD layer 202.

A source electrode 208 and a drain electrode 210 of the transistor structure 204 are disposed at two opposite ends of the 2D material layer 206. The source electrode 208 and the drain electrode 210 may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material.

A gate dielectric layer 212 is disposed over the ILD layer 202, the 2D material layer 206, the source electrode 208 and the drain electrode 210. The gate dielectric layer 212 is formed from a dielectric material such as, but not limited to, silicon oxide, silicon nitride, silicon oxynitride, hafnium oxide, tantalum oxide, hafnium silicon oxide, hafnium silicon oxynitride, hafnium tantalum oxide, hafnium titanium oxide, hafnium zirconium oxide, zirconium silicate, zirconium aluminate, tin oxide, zirconium oxide, titanium oxide, aluminum oxide, high-k dielectric, combinations thereof, and/or another suitable material, and may have a thickness ranging from about 1 nm to about 5 nm.

A gate electrode 214 is disposed over the gate dielectric layer 212 and the 2D material layer 206 and laterally between the source electrode 208 and the drain electrode 210. The gate electrode 214 may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material, and may have a thickness ranging from about 10 nm to about 20 nm. In some embodiments, the gate electrode 214, the source electrode 208 and the drain electrode 210 are formed from the same or similar material.

FIG. 2D to FIG. 2I exemplarily illustrate various schematic cross-sectional views of intermediate stages in the formation of the integrated semiconductor device 200 viewed along the B1-B1' line shown in FIG. 2A in accordance with some embodiments of the present disclosure.

Figure 2D:
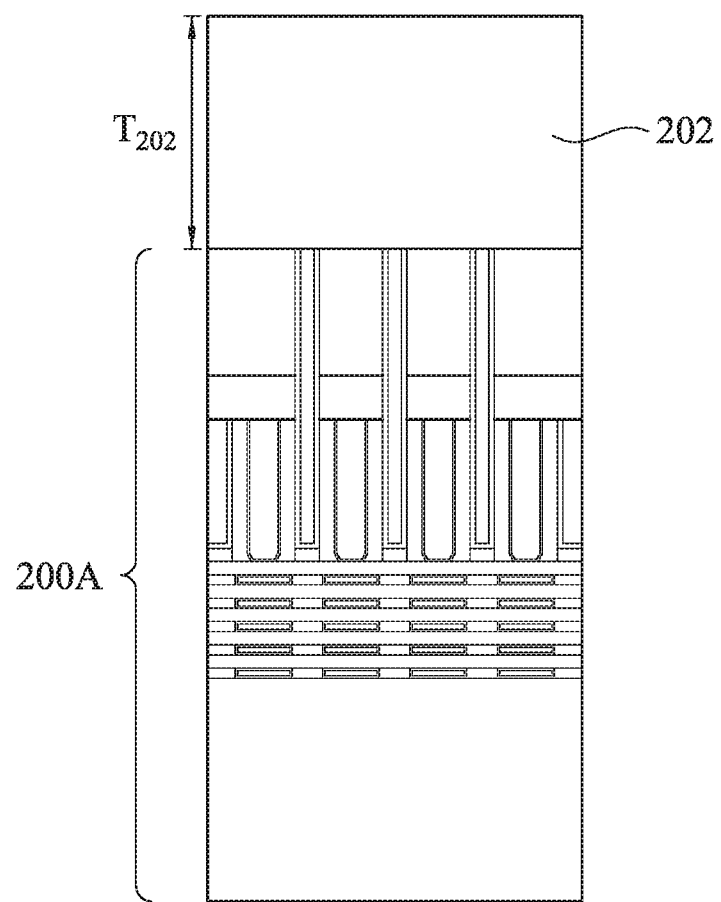
FIG. 2D to FIG. 2I exemplarily illustrate cross-sectional views of intermediate stages in the formation of the integrated semiconductor device viewed along a direction of the B1-B1' line shown in FIG. 2A in accordance with some embodiments of the present disclosure.

As shown in FIG. 2D, an ILD layer 202 is formed over a lower semiconductor device 200A. In some embodiments, the lower semiconductor device 200A may include a FinFET structure, which will be described later with reference to FIG. 2J to FIG. 2N. In various embodiments, the lower semiconductor device 200A may include a planar FET, a GAA transistor structure and/or any other suitable structure. The ILD layer 202 may be formed from one or more dielectric materials, such as silicon oxide, silicon nitride, silicon oxynitride, TEOS, PSG, BPSG, low-k dielectric material, and/or another suitable material. Examples of a low-k dielectric material include, but is not limited to, FSG, carbon doped silicon oxide, amorphous fluorinated carbon, parylene, BCB or polyimide. The ILD layer 202 may have a thickness $T_{202}$ in a range from about 10 nm to about 100 nm, and may be formed by performing a process such as chemical vapor deposition (CVD), physical vapor deposition (PVD), atomic layer deposition (ALD), spin-on coating, or another suitable process. A further planarization process, such as chemical mechanical polishing (CMP), may be performed to planarize the ILD layer 202.

Figure 2E:
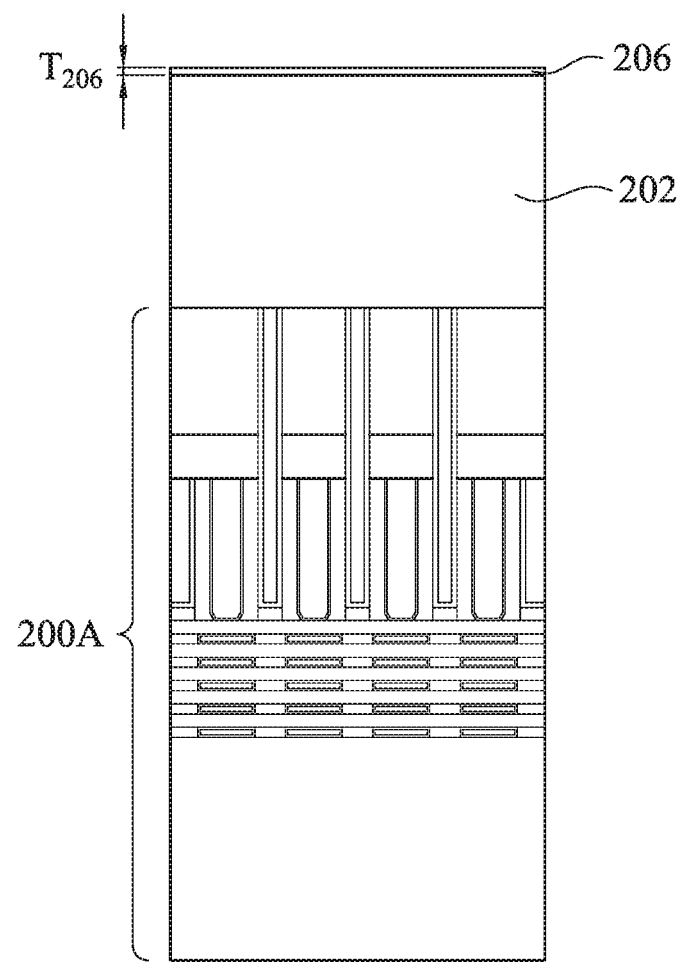

A shown in FIG. 2E, a 2D material layer 206 is formed over the ILD layer 202. In some embodiments, the 2D material layer 206 is a monolayer that is formed from, for example, graphene, bismuth, hexagonal form h-BN, molybdenum sulfide, molybdenum selenide, tungsten, sulfide tungsten selenide, tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide, indium selenide, and/or the like. In some other embodiments, the 2D material layer 206 is formed from a ternary 2D material, such as $WSe_{2(1-x)}Te_{2x}$, (where x is in a range between 0 and 1), $Ta_2NiS_5$ or $ZnIn_2S_4$, a hybridized 2D material, such as a composition of boron nitride and graphene or a composition of molybdenum sulfide and rubrene. The 2D material layer 206 may have a thickness $T_{206}$ in a range from about 10 angstroms to about 50 angstroms, and may be formed by performing a process, such as CVD, ALD, low thermal evaporation, injecting, wafer scale transfer, or another suitable process operated at a temperature lower than 400° C., depending on the material selected for the 2D material layer 206. In some alternative embodiments, multiple 2D material layers 206 with the same or different 2D materials are formed over the ILD layer 202.

Figure 2F:
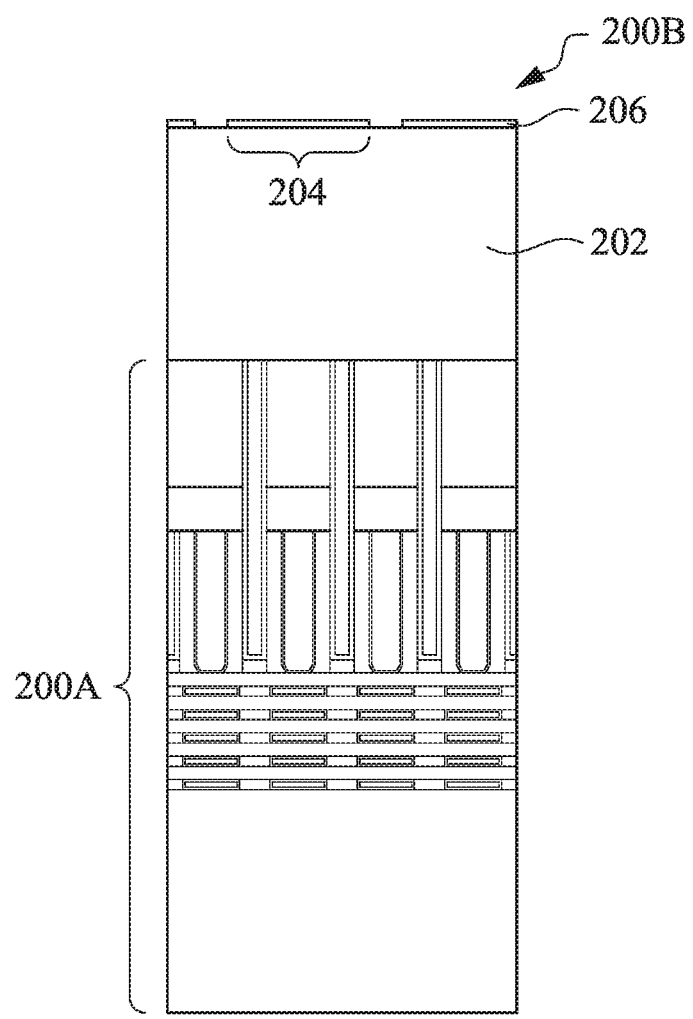

Referring to FIG. 2F, the 2D material layer 206 is patterned to form a channel layer of each of transistor structures 204 over the lower semiconductor device 200A. The transistor structures 204 are included in an upper semiconductor device 200B that is over the ILD layer 202. In some embodiments, for example, a photoresist layer (not shown) is deposited on the 2D material layer 206 and is subsequently patterned by utilizing photolithography techniques to form a photoresist mask. After the photoresist mask is formed, one or more etching processes, such an anisotropic dry etching process or the like, may be performed to remove unwanted portions of the 2D material layer 206. Subsequently, the photoresist mask may be removed be performing, for example, an ashing process and/or a wet etching process. In the following, processes for only one transistor structure 204 is described for the sake of brevity, and the other transistor structure(s) 204 may be formed by the same processes.

Figure 2G:
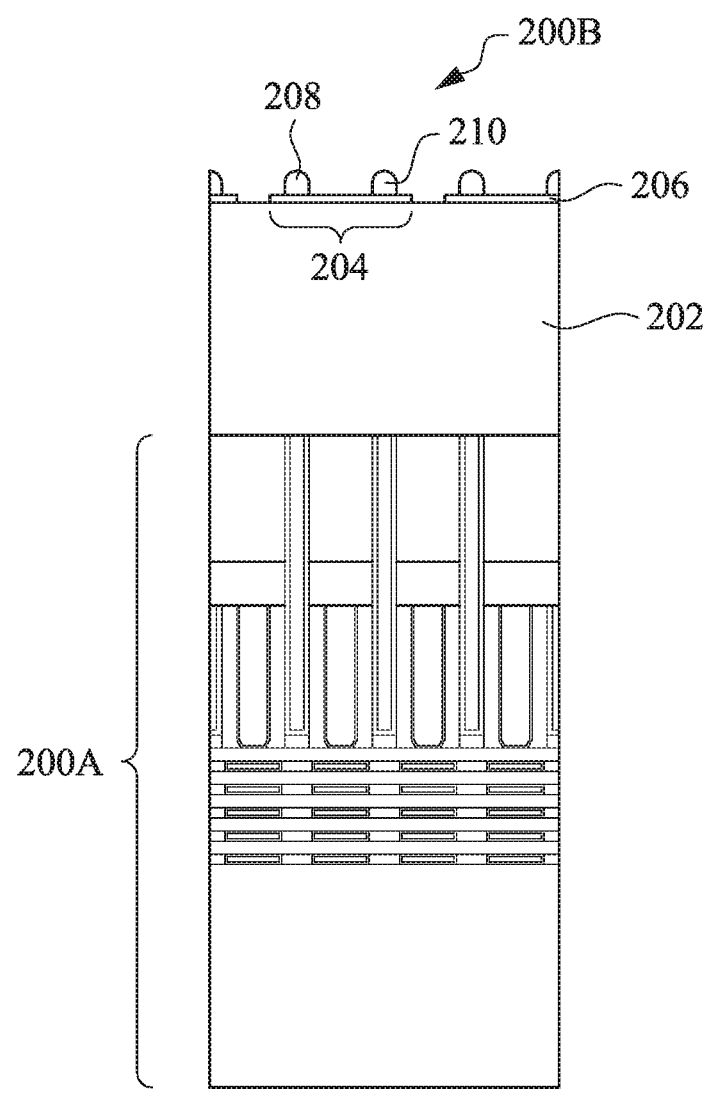

Referring to FIG. 2G, a source electrode 208 and a drain electrode 210 are formed at two opposite ends of the 2D material layer 206. The source electrode 208 and the drain electrode 210 may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material The source electrode 208 and the drain electrode 210 may be formed by performing one or more processes such as PVD, ALD, electro-chemical plating, electroless plating, combinations thereof, or another suitable process.

Figure 2H:
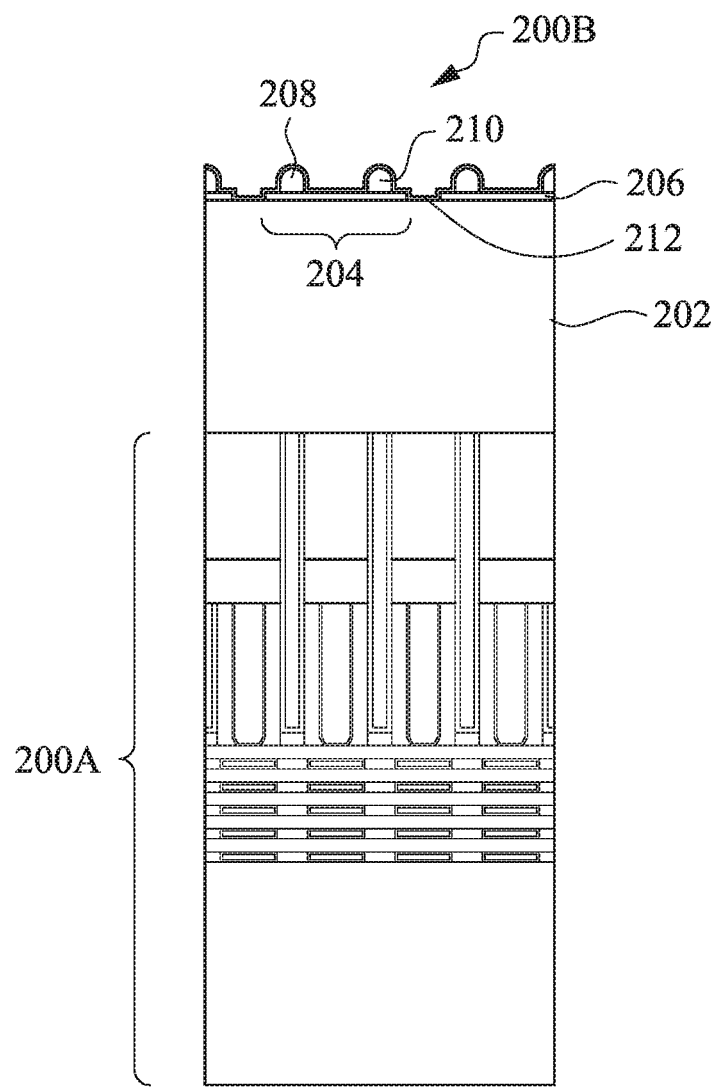

Referring to FIG. 2H, a gate dielectric layer 212 is formed over the ILD layer 202, the 2D material layer 206, the source electrode 208 and the drain electrode 210. The gate dielectric layer 212 is formed from a dielectric material such as, but not limited to, silicon oxide, silicon nitride, silicon oxynitride, hafnium oxide, tantalum oxide, hafnium silicon oxide, hafnium silicon oxynitride, hafnium tantalum oxide, hafnium titanium oxide, hafnium zirconium oxide, zirconium silicate, zirconium aluminate, tin oxide, zirconium oxide, titanium oxide, aluminum oxide, high-k dielectric, combinations thereof, and/or another suitable material. The gate dielectric layer 212 may have a thickness ranging from about 1 nm to about 5 nm, and may be formed by performing a process such as CVD, PECVD, HDPCVD, ALD, spin-on coating, sputtering, combinations thereof, or another suitable process.

Figure 2I:
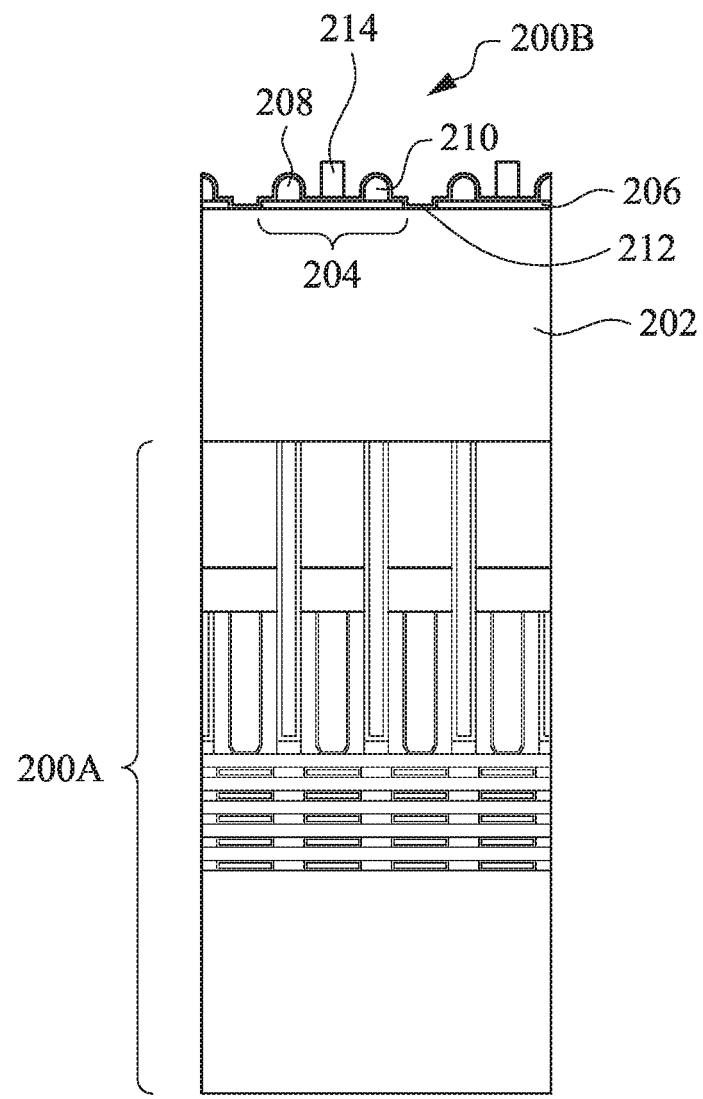

Referring to FIG. 2I, a gate electrode 214 is formed over the gate dielectric layer 212 and the 2D material layer 206 and laterally between the source electrode 208 and the drain electrode 210. The gate electrode 214 may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material. The gate electrode 214 may have a thickness ranging from about 10 nm to about 20 nm, and may be formed by performing a process such as PVD, ALD, electro-chemical plating, electroless plating, combinations thereof, or another suitable process. In some embodiments, the gate electrode 214, the source electrode 208 and the drain electrode 210 are formed from the same or similar material.

For the formation of the integrated semiconductor device 200 shown in FIG. 2E to FIG. 2I, the 2D material layer 206 of each of the transistor structures 202 in the upper semiconductor device 200B can be formed by performing low thermal budget process(es), the integrated semiconductor device 200 can be made without sacrificing the performance of the upper semiconductor device 200B (including the transistor structures 204) and/or degrading the lower semiconductor device 200A.

FIG. 2J to FIG. 2N exemplarily illustrate various cross-sectional views of intermediate stages in the formation of the lower semiconductor device 200A of the integrated semiconductor device 200 viewed along the B1-B1' line shown in FIG. 2A in accordance with some embodiments of the present disclosure.

Figure 2K:
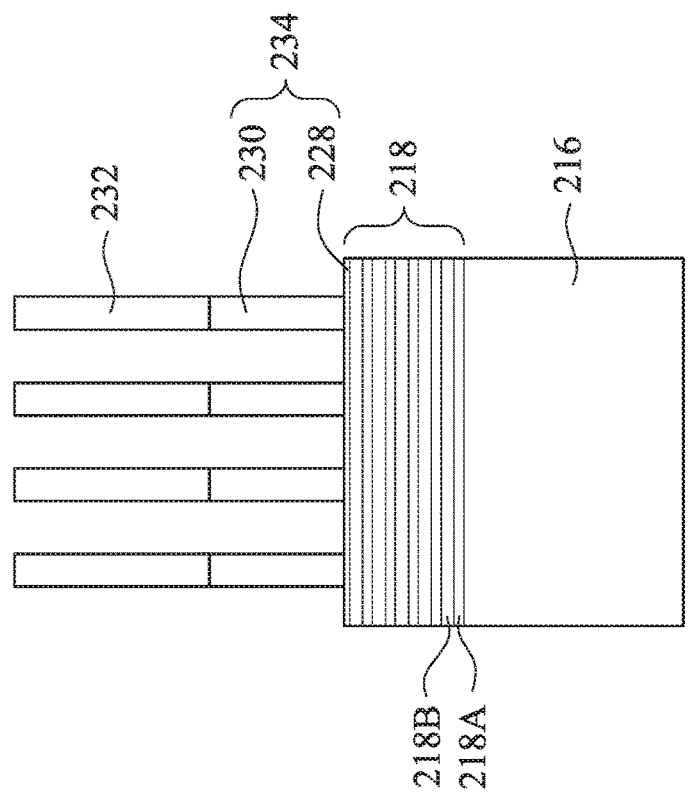
FIG. 2J to FIG. 2N exemplarily illustrate cross-sectional views of intermediate stages in the formation of a lower semiconductor device of the integrated semiconductor device viewed along the direction of the B1-B1' line shown in FIG. 2A in accordance with some embodiments of the present disclosure.
Figure 2J:
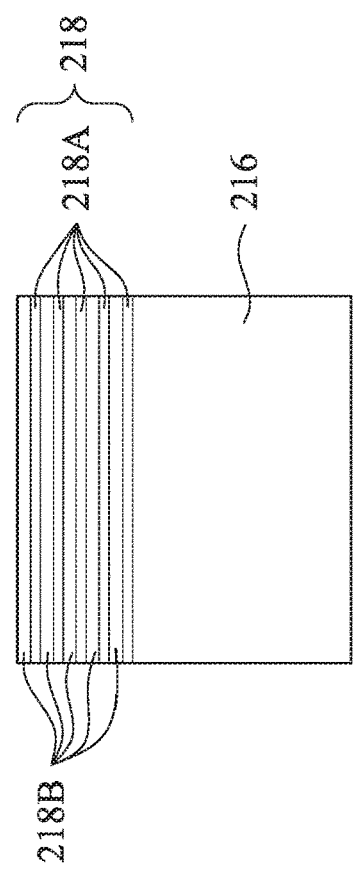

Referring to FIG. 2J, a substrate 216 is provided, and subsequent elements are formed in or over the substrate 216, which will be expatiated in the following paragraphs. The substrate 216 may be a semiconductor substrate, such as a bulk semiconductor substrate, an SOI substrate, a multi-layered or gradient substrate, or the like. The substrate 216 may include a semiconductor material, such as an elemental semiconductor material including silicon or gallium, a compound or alloy semiconductor including silicon carbide, silicon-germanium, gallium arsenide, gallium phosphide, indium phosphide, indium antimonide, gallium arsenide phosphide, aluminum indium arsenide, aluminum gallium arsenide, gallium indium arsenide, indium arsenide, gallium indium phosphide, gallium indium arsenide phosphide, or a combination thereof, or another suitable semiconductor material. In some examples, the substrate 216 includes a crystalline silicon substrate, such as a wafer.

The substrate 216 may be doped or undoped depending on design requirements. In some embodiments, the substrate 216 includes one or more doped regions that may be doped with p-type impurities (such as boron or boron fluoride) or n-type impurities (such as phosphorus or arsenic), and a dopant concentration of the doped regions may be, for example, in a range from about $10^{17}$ atoms/cm$^3$ to about $10^{18}$ atoms/cm$^3$. A further annealing process may be performed on the doped regions to activate the p-type and n-type impurities in the doped regions.

Also shown in FIG. 2J, an epitaxial layer structure 218 is formed over the substrate 216 and including alternating first epitaxial layers 218A and second epitaxial layers 218B for forming fins. Each of the first epitaxial layers 218A and second epitaxial layers 218B may be formed from a group IV material, such as silicon, germanium, silicon germanium, silicon germanium tin, or the like; a group III-V compound material, such as gallium arsenide, gallium phosphide, indium arsenide, indium phosphide, indium antimonide, gallium arsenide phosphide, aluminum indium arsenide, aluminum gallium arsenide, gallium indium arsenide, gallium indium phosphide, gallium indium arsenide phosphide, or the like; or another suitable material. The first epitaxial layers 218A and the second epitaxial layers 218B may be formed from silicon germanium and silicon, respectively. Alternatively, the first epitaxial layers 218A and the second epitaxial layers 218B may be formed from silicon and silicon germanium, respectively. The first epitaxial layers 218A and the second epitaxial layers 218B may be epitaxially grown by utilizing, for example, metal organic chemical vapor deposition (MOCVD), molecular beam epitaxy (MBE), liquid phase epitaxy (LPE), vapor phase epitaxy (VPE), ultra high vacuum chemical vapor deposition (UHVCVD), combinations thereof, or other suitable techniques. The epitaxial layer structure 218 may have a thickness in a range from about 40 nm to about 90 nm, and each of the first epitaxial layers 218A and the second epitaxial layers 218B may have a thickness in a range from about 3 nm to about 20 nm.

As illustrated In FIG. 2J, the epitaxial layer structure 218 includes five first epitaxial layers 218A and five second epitaxial layers 218B. In various embodiments, the epitaxial layer structure 218 may include any number of first epitaxial layers 218A and any number of second epitaxial layers 218B.

After the epitaxial layer structure 218 is formed, an etching process may be performed on the epitaxial layer structure 218 and the substrate 216 to form fins that include the remained portions of the epitaxial layer structure 218 and the underlying substrate 216. A channel height of each of the fins is in a range from about 40 nm to about 90 nm, and a pitch of two neighboring fins is in a range from about 10 nm to about 60 nm. The etching process performed on the epitaxial layer structure 218 and the substrate 216 may be, for example, an anisotropic etching process such as dry etching, reactive ion etching (RIE), neutral beam etching (NBE), a combination thereof, or any other suitable process.

Referring to FIG. 2K, a dummy gate dielectric layer 228 is formed over the epitaxial layer structure 218, and then a dummy gate electrode layer 230 is formed over the dummy gate dielectric layer 228.

The dummy gate dielectric layer 228 may be formed from silicon oxide, silicon nitride, silicon oxynitride, a low-k dielectric such as carbon doped oxide, extremely low-k dielectrics such as porous carbon doped silicon dioxide, a polymer such as polyimide, a high-k dielectric silicon nitride, oxynitride, hafnium oxide, hafnium zirconium oxide, hafnium silicon oxide, hafnium titanium oxide or hafnium aluminum oxide, or another suitable material, and may be formed by performing a process such as thermal oxidation, CVD, plasma enhanced CVD (PECVD), sub-atmospheric CVD (SACVD), PVD, sputtering, or another suitable process known in the art.

The dummy gate electrode layer 230 is a conductive material and may be formed from amorphous silicon, polycrystalline silicon, polycrystalline silicon germanium, metal, metallic nitride, metallic silicide, metallic oxide, or the like. The dummy gate electrode layer 230 may be deposited by PVD, CVD, ALD, sputtering, or another suitable process known in the art. In another embodiment, a non-conductive material may be used to form the dummy gate electrode layer 230.

After the dummy gate dielectric layer 228 and the dummy gate electrode layer 230 are formed, a hard mask layer 232 is formed over the dummy gate electrode layer 230. The hard mask layer 232 may be formed from an oxide material such as silicon oxide, hafnium oxide, a nitride material such as such as silicon nitride, silicon carbon nitride, titanium nitride, a combination thereof, or another suitable material. The hard mask layer 232 may be formed by performing a process such as thermal oxidation, CVD, low-pressure CVD (LPCVD), PECVD, PVD, ALD, combinations thereof, or another suitable process, and may be patterned by utilizing photolithography techniques.

Then, an etching process is performed to pattern the dummy gate dielectric layer 228 and the dummy gate electrode layer 230 with the assistance of the hard mask layer 232, so as to form dummy gate stacks 234 that respectively include the remaining portions of the dummy gate dielectric layer 228 and the dummy gate electrode layer 230. During the etching process, the dummy gate dielectric layer 228 serves as an etch stop layer to protect the fins which are under the dummy gate dielectric layer 228. The etching process to the dummy gate dielectric layer 228 and the dummy gate electrode layer 230 may include an acceptable anisotropic etching process, such as RIE, NBE, combinations thereof, or another suitable etching process. The hard mask layer 232 is then removed after the dummy gate dielectric layer 228 and the dummy gate electrode layer 230 are etched.

In some embodiments, the first epitaxial layers 218A of each of the fins may be selectively etched, and the remaining second epitaxial layers 218B of each of the fins form nanowires. For illustration, in the embodiments in which the first epitaxial layers 218A are formed of silicon germanium and the second epitaxial layers 218B are formed of silicon, the first epitaxial layers 218A are removed using an etchant that etches the silicon germanium at a higher rate than the silicon, such as $NH_4OH:H_2O_2:H_2O$ (ammonia peroxide mixture), $H_2SO_4+H_2O_2$ (sulfuric acid peroxide mixture), or the like, and the second epitaxial layers 218B are remained to form nanowires. Alternatively, in the embodiments in which the first epitaxial layers 218A are formed of silicon and the second epitaxial layers 218B are formed of silicon germanium, the second epitaxial layers 218B are removed, and the first epitaxial layers 218A are remained to form nanowires.

Figure 2M:
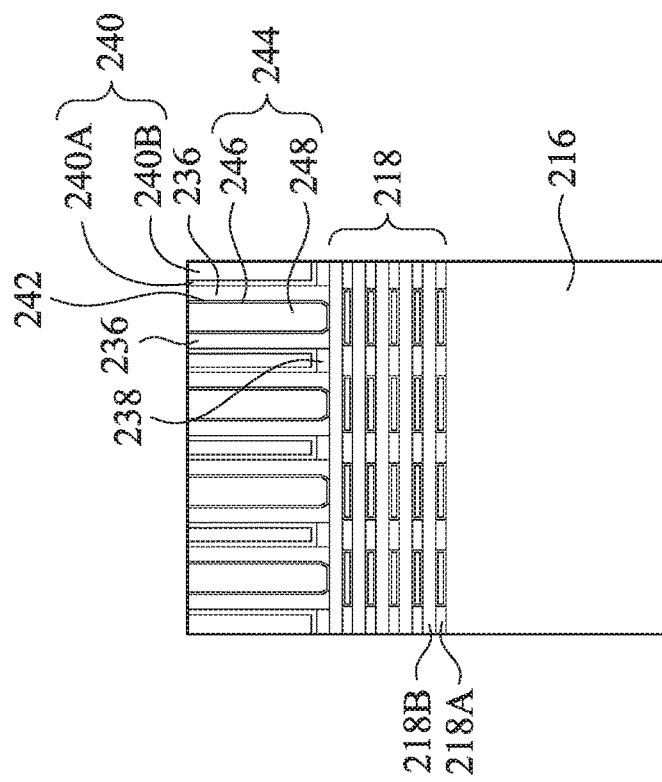
Figure 2L:
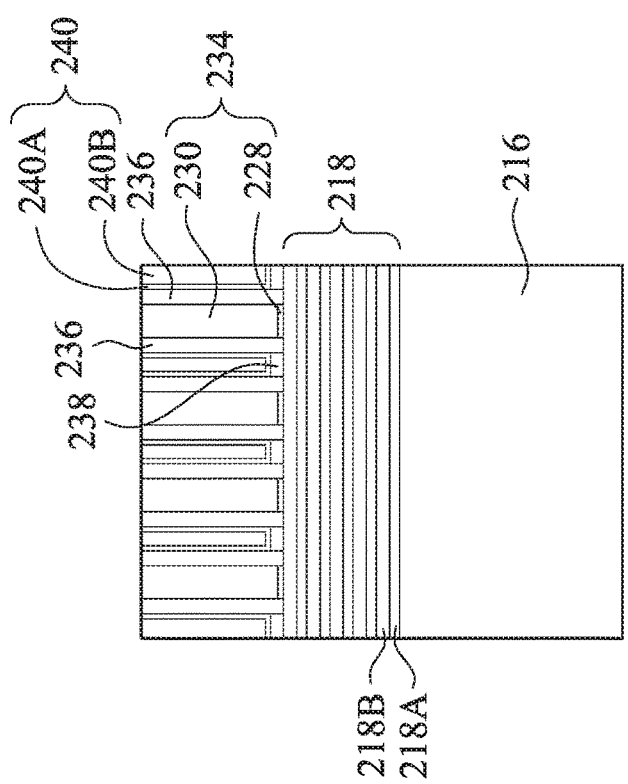

In FIG. 2L, a spacer layer 236 is formed along opposite sidewalls of the dummy gate stacks 234. The spacer layer 236 may be formed from a dielectric material, such as silicon oxide, silicon nitride, silicon oxynitride, silicon carbide, combinations thereof, or another suitable material, and may be formed by using one or more processes such as, but not limited to, a deposition process, a lithography process, an etching process, and/or combinations thereof. In alternative embodiments, the spacer layer 236 may be a composite structure that includes multiple layers.

Afterwards, source/drain regions 238 are formed over exposed portions of the fins (e.g. uncovered by the spacer layer 236 and the dummy gate stacks 234), respectively, along opposing sides of the dummy gate stacks 234 in accordance with some embodiments. The use of epitaxial grown materials in the source/drain regions 238 allows the source/drain regions 238 to exert stress in the channel regions, in addition to the stress caused by the alternating first epitaxial layers 218A and second epitaxial layers 218B. The materials used for the source/drain regions 238 may be varied for various types (e.g. n-type and p-type) of FinFETs, such that one type of material is used for n-type FinFETs to exert a tensile stress in the channel region, and that another type of material is used for p-type FinFETs to exert a compressive stress. For illustration, some of the source/drain regions 238 may include, for example, silicon phosphide, silicon carbide, arsenic doped silicon, phosphorus doped silicon or phosphorus doped silicon germanium, or the like, in order to form n-type FinFETs, and the others of the source/drain regions 238 may include, for example, silicon, germanium or silicon germanium doped with boron or gallium or tin doped silicon germanium, or the like, in order to form p-type FinFETs.

In the embodiments in which different materials are used for n-type devices and p-type devices, it may be desirable to mask one (e.g. the n-type fins) while forming the epitaxial material on the other (e.g. the p-type fins), and repeating the process for the other. The source/drain regions 238 may be doped either through an implanting process to implant appropriate dopants, or by in-situ doping as the material is grown. In some embodiments, some of the source/drain regions 238 are formed from silicon phosphide or silicon carbide doped with phosphorus to form an n-type FinFET, and the others of the source/drain regions 238 are formed from silicon germanium or germanium doped with boron to form a p-type FinFET. The source/drain regions 238 may be implanted with p-type and n-type dopants, respectively. The source/drain regions 238 may have an impurity concentration in a range from about $10^{19}$ atoms/cm$^3$ to about $10^{21}$ atoms/cm$^3$.

After the source/drain regions 238 are formed, an interlayer dielectric (ILD) layer 240 is formed over the source/drain regions 238 and the substrate 216. The ILD layer 240 may be formed from one or more dielectric materials, such as silicon oxide, silicon nitride, silicon oxynitride, TEOS, PSG, BPSG, low-k dielectric material, and/or another suitable material. Examples of a low-k dielectric material include, but is not limited to, FSG, carbon doped silicon oxide, amorphous fluorinated carbon, parylene, BCB or polyimide. The ILD layer 240 may be formed by performing one or more processes such as CVD, PVD, ALD, spin-on coating, or another suitable process. As shown in FIG. 2L, in some embodiments, the ILD layer 240 is a bilayer structure that includes two sublayers 240A and 240B. In various embodiments, the ILD layer 240 may be a single layer or multiple layers. A further planarization process, such as CMP, may be performed to planarize the ILD layer 240.

Referring to FIG. 2M, after the formation of the ILD layer 240, the dummy gate stacks 234 are removed, so as to form recesses 242 in the ILD layer 240. The dummy gate stacks 234 may be removed by performing one or more etching processes. For example, the dummy gate electrode layer 230 may be removed by performing a dry etching process, and then the dummy gate dielectric layer 228 may be removed by performing a wet etching process. However, other suitable etching processes may be used to remove the dummy gate stacks 234.

Afterwards, gates 244 are formed respectively filling the recesses 242. In detail, the gates 244 respectively include gate dielectrics 246 and gate electrodes 248. The gate dielectrics 246 are respectively formed conformal to the recesses 242, and the gate electrodes 248 are formed respectively over the gate dielectrics 246 in the recesses 242.

The gate dielectrics 246 may be formed from a dielectric material such as, but not limited to, silicon oxide, silicon nitride, silicon oxynitride, hafnium oxide, tantalum oxide, hafnium silicon oxide, hafnium silicon oxynitride, hafnium tantalum oxide, hafnium titanium oxide, hafnium zirconium oxide, zirconium silicate, zirconium aluminate, tin oxide, zirconium oxide, titanium oxide, aluminum oxide, high-k dielectric, combinations thereof, and/or another suitable material. In some embodiments, the gate dielectrics 246 include a multi-layer structure of, for example, silicon oxide or silicon oxynitride with a high-k dielectric material. The gate dielectrics 246 may be formed by performing one or more processes including, but not limited to, CVD, PECVD, HDPCVD, ALD, spin-on coating, sputtering, combinations thereof, or another suitable process.

The gate electrodes 248 may be formed by using one or more processes including, but not limited to, PVD, CVD, LPCVD, ALD, spin-on deposition, plating, and/or combinations thereof. The gate electrodes 248 may be formed from a metallic material such as titanium, tantalum, tungsten, aluminum, molybdenum, platinum and hafnium, a metal silicide material (such as titanium silicide, tantalum silicide, tungsten silicide, molybdenum silicide, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material.

Figure 2N:
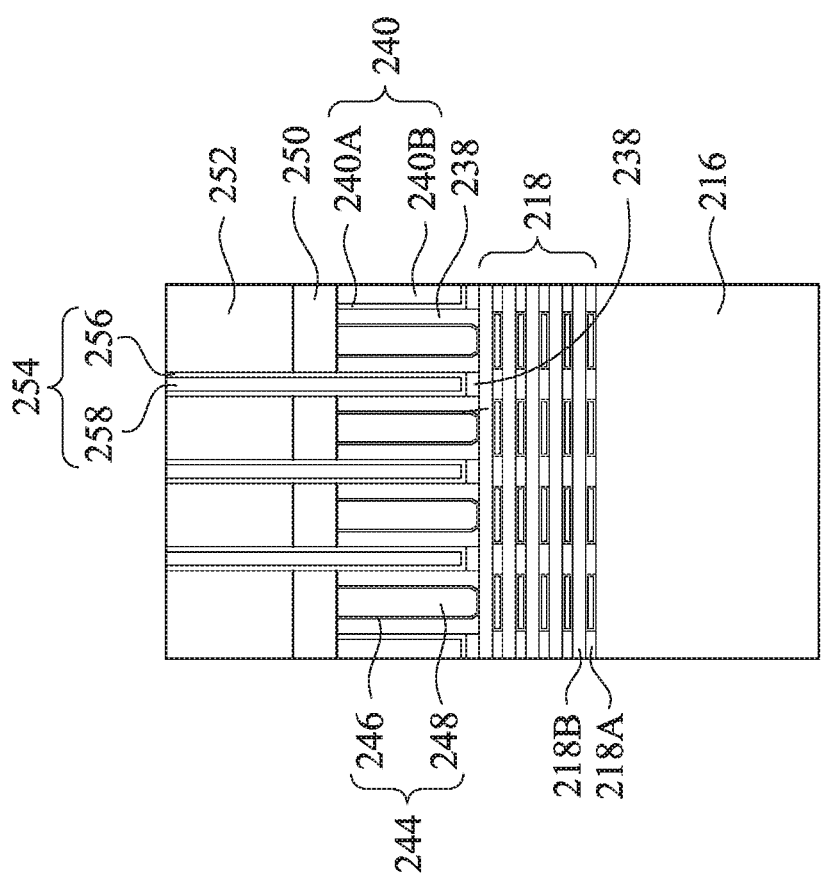

Referring to FIG. 2N, an etch stop layer 250 and an ILD layer 252 are sequentially formed over the structure shown in FIG. 2M. The etch stop layer 250 may be formed from silicon nitride, titanium nitride, aluminum nitride, or and/or another etchant selectable material. The etch stop layer 250 may be a single layer or multiple layers in various embodiments, and may have a thickness of about 5 nm. The etch stop layer 250 may be formed by performing one or more processes, such as CVD, PECVD, MOCVD, ALD, sputtering, and/or another suitable process.

The ILD layer 252 may be formed from one or more dielectric materials, such as silicon oxide, silicon nitride, TEOS, PSG, BPSG, low-k dielectric material, and/or another suitable material. Examples of a low-k dielectric material include, but is not limited to, FSG, carbon doped silicon oxide, amorphous fluorinated carbon, parylene, BCB or polyimide. The ILD layer 252 may have a thickness ranging from about 15 nm to about 85 nm, and may be formed by performing a process such as CVD, PVD, ALD, spin-on coating, or another suitable process. A further planarization process, such as CMP, may be performed to planarize the ILD layer 252.

Subsequently, one or more etching processes are performed on the ILD layer 252, the etch stop layer 250 and the ILD layer 240 to form recesses, and then conductive plugs 254 are formed respectively by filling the recesses. In some embodiments, for example, a photoresist layer (not shown) is deposited on the ILD layer 252 and is subsequently patterned by utilizing photolithography techniques to form a photoresist mask. After the photoresist mask is formed, one or more etching processes, such an anisotropic dry etching process or the like, may be performed to etch portions of the ILD layer 252, the etch stop layer 250 and the ILD layer 240 vertically uncovered by the photoresist mask. The etching process may be stopped when a depth of the recesses reaches a predetermined value. In some embodiments, bottoms of the recesses are vertically higher than a top surface of the ILD layer 240. Subsequently, the photoresist mask may be removed be performing, for example, an ashing process and/or a wet etching process.

The conductive plugs 254 include a liner 256 and respectively include contacts 258. The liner 256 is formed conformal to the recesses, and then the contacts 258 are formed over the liner 256 and respectively filling the recesses. The liner 256 may include titanium, titanium nitride, tantalum, tantalum nitride, or the like, and may be formed by performing a process such as ALD, CVD, or the like. The contacts 258 may be formed from gold, silver, copper, tungsten, aluminum, nickel, combinations thereof, a metal alloy, or the like, and may be formed by performing a process such as ALD, CVD, PVD, or the like. A further planarization process, such as CMP, may be performed to remove excessing portions of the contacts 258 and the liner 256 above a top surface of the ILD layer 252. Consequently, the semiconductor device 200A (e.g. with a FinFET structure in the embodiments) is formed, in which conductive plugs 254 are formed through the ILD layer 252, the etch stop layer 250 and the ILD layer 240 to various components, such as source/drain regions 238 and/or other components not shown in the drawings. In some other embodiments, the conductive plugs 254 respectively include the contacts 258 without the liner 256.

Figure 3A:
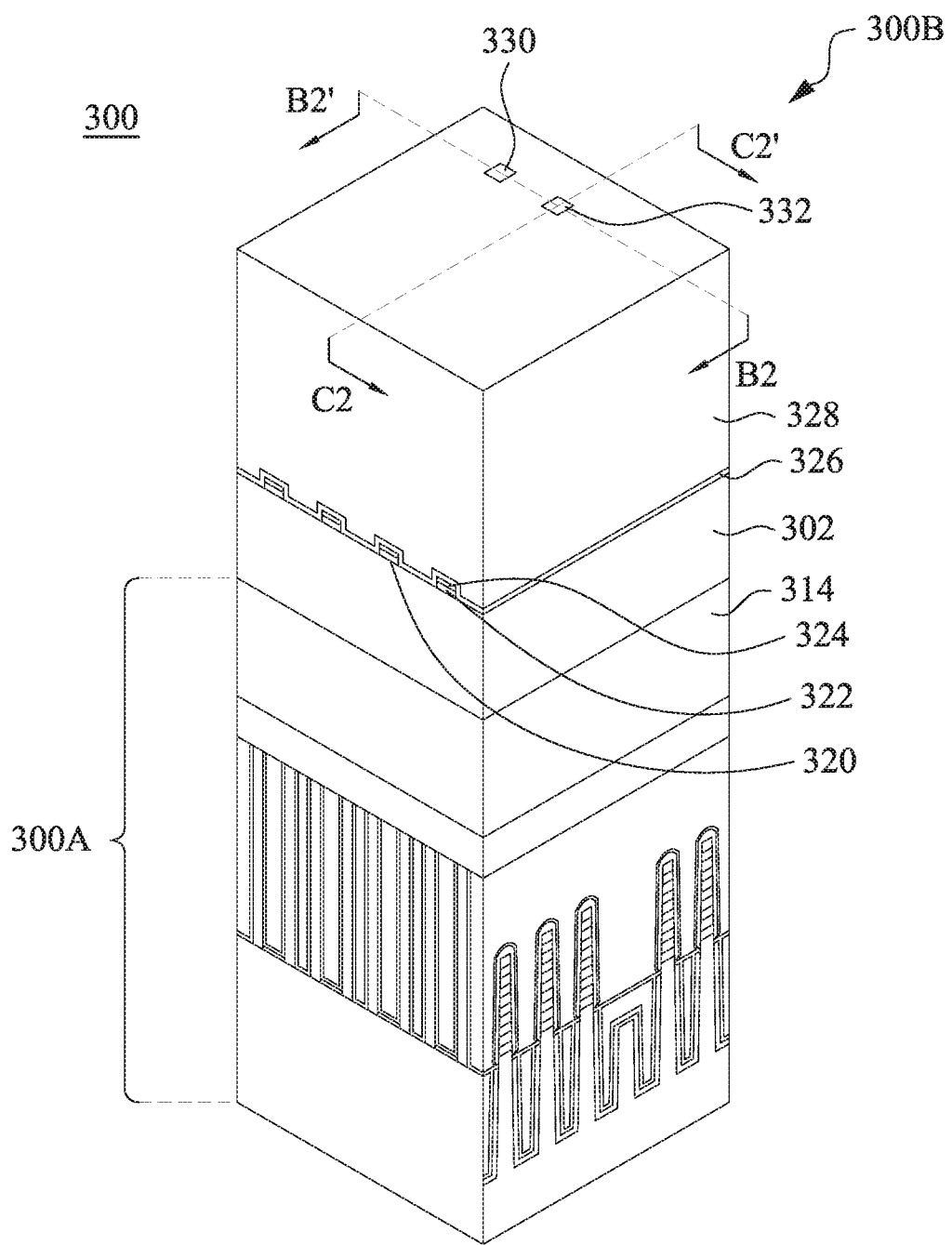
FIG. 3A exemplarily illustrates a schematic perspective view of an integrated semiconductor device in accordance with some embodiments of the present disclosure.
Figure 3B:
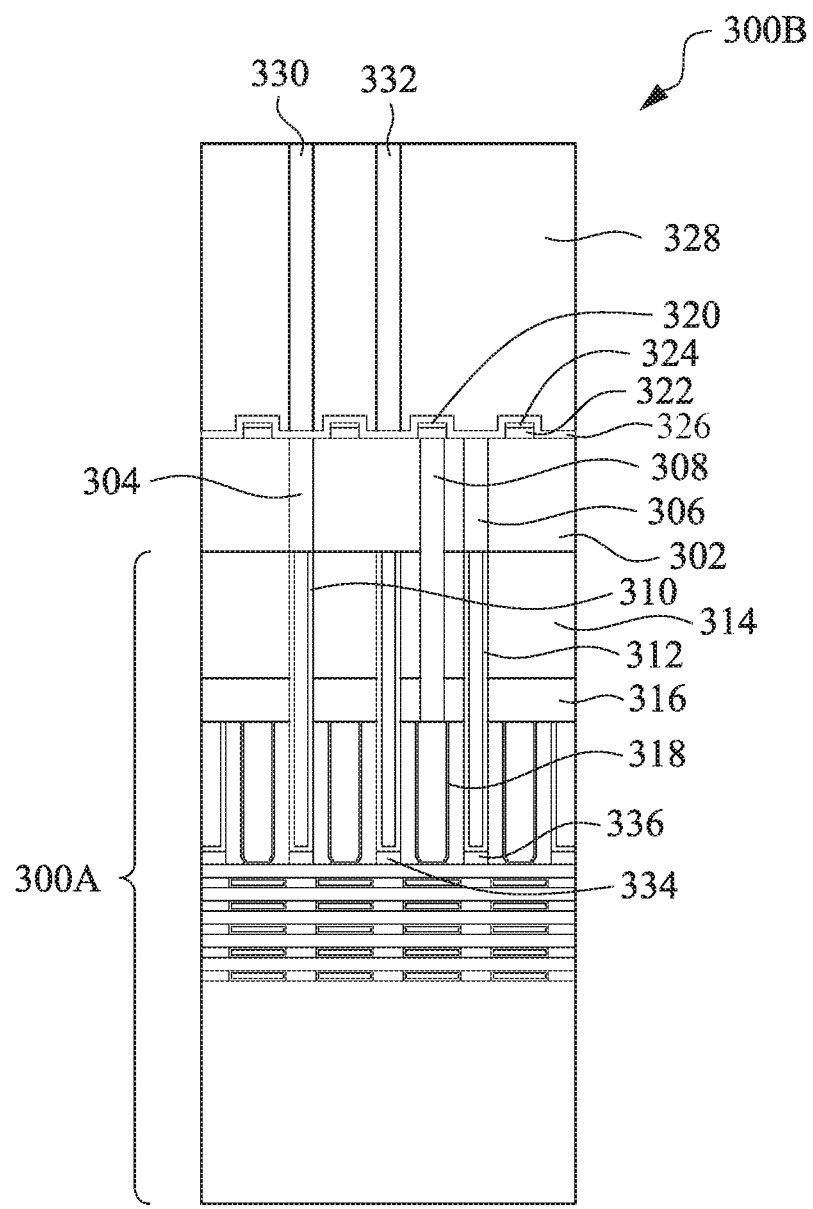
FIG. 3B is a schematic cross-sectional view of the integrated semiconductor device viewed along a B2-B2' line shown in FIG. 3A.
Figure 3C:
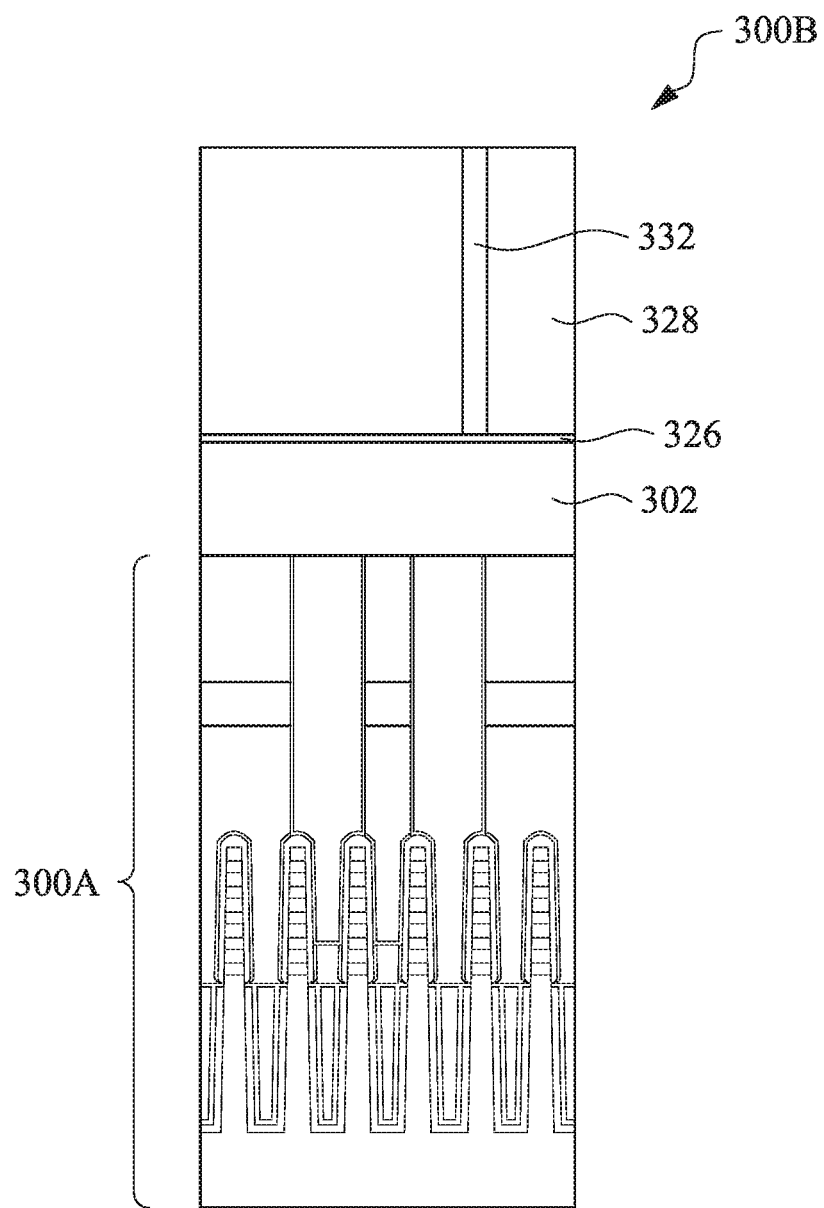
FIG. 3C is a schematic cross-sectional view of the integrated semiconductor device viewed along a C2-C2' line shown in FIG. 3A.

In various embodiments, a lower semiconductor device and an upper semiconductor device integrated in a 3D stacked semiconductor device may collectively form an electrical circuit structure. For example, FIG. 3A exemplarily illustrates a schematic perspective view of an integrated semiconductor device 300 in accordance with some embodiments of the present disclosure, and FIG. 3B and FIG. 3C are schematic cross-sectional views of the integrated semiconductor device 300 along a B2-B2' line and a C2-C2' line (which is perpendicular to the B-B' line) in FIG. 3A, respectively.

The integrated semiconductor device 300 includes a lower semiconductor device 300A and an upper semiconductor device 300B. In some embodiments, as shown in FIG. 3A to FIG. 3C, the lower semiconductor device 300A may include a FinFET structure, and is similar to the lower semiconductor device 200A shown in FIG. 2A to FIG. 2C, and the intermediate stages in the formation of the lower semiconductor device 300A are assimilate to those shown in FIG. 2J to FIG. 2N, and thus detailed descriptions of the lower semiconductor device 300A are not described again herein. In various embodiments, the lower semiconductor device 300A may include a planar FET, a GAA transistor structure and/or any other suitable structure.

An ILD layer 302 is interposed between the lower semiconductor device 300A and the upper semiconductor device 300B. The ILD layer 302 may include one or more dielectric material of layers, which may include one or more dielectric materials, such as silicon oxide, silicon nitride, TEOS, PSG, BPSG, low-k dielectric material, and/or another suitable material. Examples of a low-k dielectric material include, but is not limited to, FSG, carbon doped silicon oxide, amorphous fluorinated carbon, parylene, BCB or polyimide. The ILD layer 302 may have a thickness in a range from about 10 nm to about 100 nm for process tolerance concern, i.e., in order to avoid damaging to the lower semiconductor device 300A during the formation of the subsequent element (s) over the ILD layer 302 (including the elements of the upper semiconductor device 300B).

In the upper semiconductor device 300B, conductive plugs 304, 306 and 308 extend downwards from an upper surface of the ILD layer 302. The conductive plugs 304 and 306 penetrate through the ILD layer 302 to respectively contact the conductive plugs 310 and 312 that are in the lower semiconductor device 300A, and the conductive plugs 308 penetrate through the ILD layer 302 and an ILD layer 314 and an etch stop layer 316 of the lower semiconductor device 300A to contact a gate 318 that is in the lower semiconductor device 300A. The conductive plugs 304, 306 and 308 may be formed from gold, silver, copper, tungsten, aluminum, nickel, combinations thereof, a metal alloy, or the like.

Gate stacks 320 are over the ILD layer 302. Each of the gate stacks 320 includes a metal layer 322 a dielectric layer 324 that are sequentially stacked over the ILD layer 302. That is, as shown in FIG. 3B, each gate stack 320 is a stacked structure, in which the metal layer 322 is formed over the ILD layer 302 and the dielectric layer 324 is formed over the metal layer 322. The metal layer 322 may have a thickness ranging from about 10 nm to about 20 nm and may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material. The dielectric layer 324 may have a thickness ranging from about 1 nm to about 5 nm and may be formed from a dielectric material such as, but not limited to, silicon oxide, silicon nitride, silicon oxynitride, hafnium oxide, tantalum oxide, hafnium silicon oxide, hafnium silicon oxynitride, hafnium tantalum oxide, hafnium titanium oxide, hafnium zirconium oxide, zirconium silicate, zirconium aluminate, tin oxide, zirconium oxide, titanium oxide, aluminum oxide, high-k dielectric, combinations thereof, and/or another suitable material. As shown in FIG. 3B, one of the gate stacks 320 contacts the conductive plug 308.

A 2D material layer 326 is formed over the gate stacks 320, the ILD layer 302 and the conductive plugs 304, 306 and 308. In some embodiments, the 2D material layer 326 is a monolayer that is formed from, for example, graphene, bismuth, hexagonal form boron nitride (h-BN), molybdenum sulfide, molybdenum selenide, tungsten, sulfide tungsten selenide, tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide, indium selenide, and/or the like. In some other embodiments, the 2D material layer 326 is formed from a ternary 2D material, such as $WSe_{2(1-x)}Te_{2x}$, (where x is in a range between 0 and 1), $Ta_2NiS_5$ or $ZnIn_2S_4$, a hybridized 2D material, such as a composition of boron nitride and graphene or a composition of molybdenum sulfide and rubrene. The 2D material layer 326 may have a thickness ranging from about 10 angstroms to about 50 angstroms. In some alternative embodiments, multiple 2D material layers with the same or different 2D materials are formed over the gate stacks 320, the ILD layer 302 and the conductive plugs 304, 306 and 308.

An inter-metal dielectric (IMD) layer 328 is formed over the 2D material layer 326. In some embodiments, the IMD layer 328 is formed from a dielectric material, such as silicon oxide or another suitable low-k dielectric material. Examples of a low-k dielectric material for the IMD layer 328 may include, but is not limited to, FSG, carbon doped silicon oxide, amorphous fluorinated carbon, parylene, BCB or polyimide. As shown in FIG. 3A to FIG. 3C, the IMD layer 328 also includes conductive vias 330 and 332 which penetrate therethrough to contact the 2D material layer 326. The conductive vias 330 and 332 may be formed from gold, silver, copper, tungsten, aluminum, nickel, combinations thereof, a metal alloy, or the like.

Figure 3D:
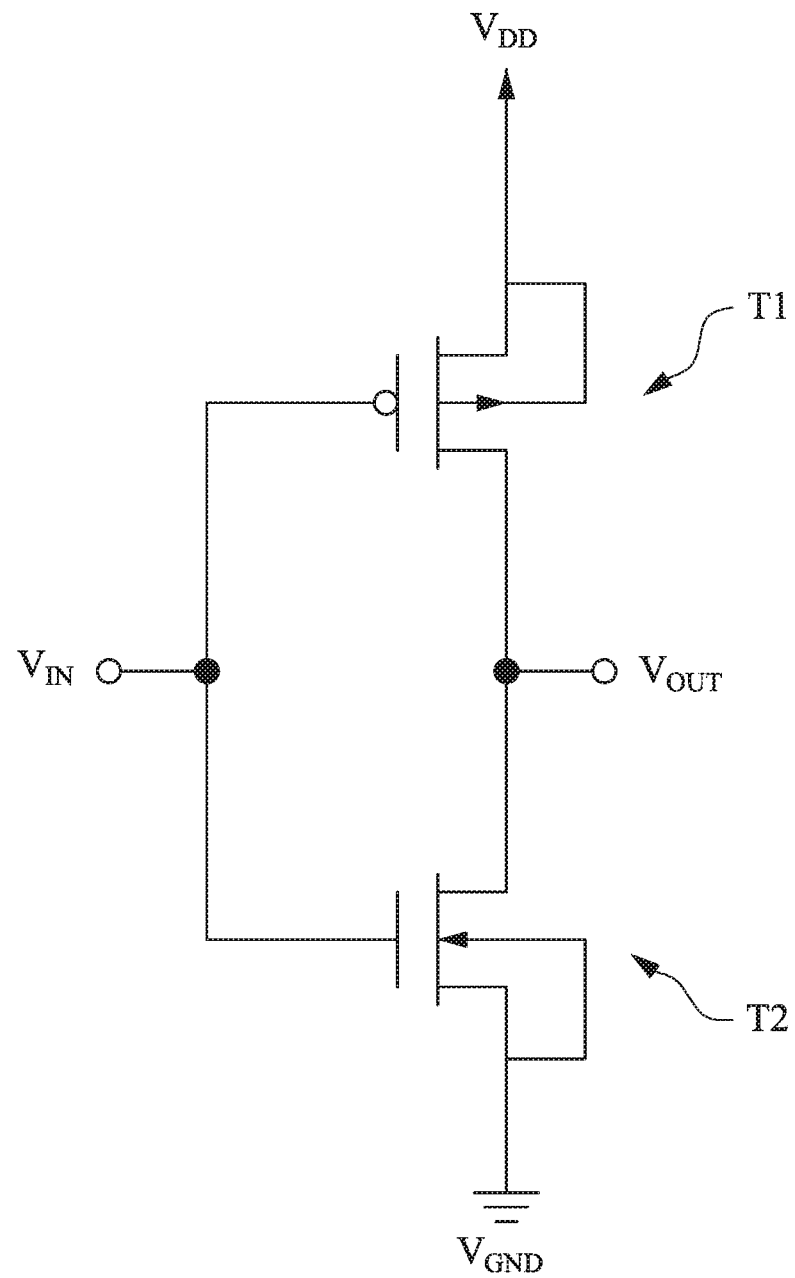
FIG. 3D is an equivalent circuit diagram of the integrated semiconductor device shown in FIG. 3A.

FIG. 3D is an equivalent circuit diagram of the integrated semiconductor device 300 shown in FIG. 3A. In FIG. 3D, a circuit of an inverter is illustrated, in which a pull-up transistor T1 and a pull-down transistor T2 are serially coupled between a supply source (which may provide a power supply voltage $V_{DD}$), a complementary supply source (which may provide a ground voltage $V_{GND}$), an input node (which is arranged to receive an input voltage $V_{IN}$) and an output node (which is arranged to provide an output voltage $V_{OUT}$). The pull-up transistor T1 and the pull-down transistor T2 may be a p-type FET and an n-type FET, respectively. The sources of the pull-up transistor T1 and the pull-down transistor T2 respectively correspond to the upper semiconductor device 300B and the lower semiconductor device 300A of the integrated semiconductor device 300 shown in FIG. 3A. In detail, the source, the drain and the gate of the pull-up transistor T1 respectively correspond to the conductive via 332, the conductive plug 306 and one of the gate stacks 320, and the source, the drain and the gate of the pull-down transistor T2 respectively correspond to source/ drain regions 334 and 336 and a gate 318 in the lower semiconductor device 300A, and the input node and the output node respectively correspond to the conductive plugs 308 and 312.

FIG. 3E to FIG. 3J exemplarily illustrate various cross-sectional views of intermediate stages in the formation of an integrated semiconductor device 300 viewed along the B2-B2' line shown in FIG. 3A in accordance with some embodiments of the present disclosure.

Figure 3E:
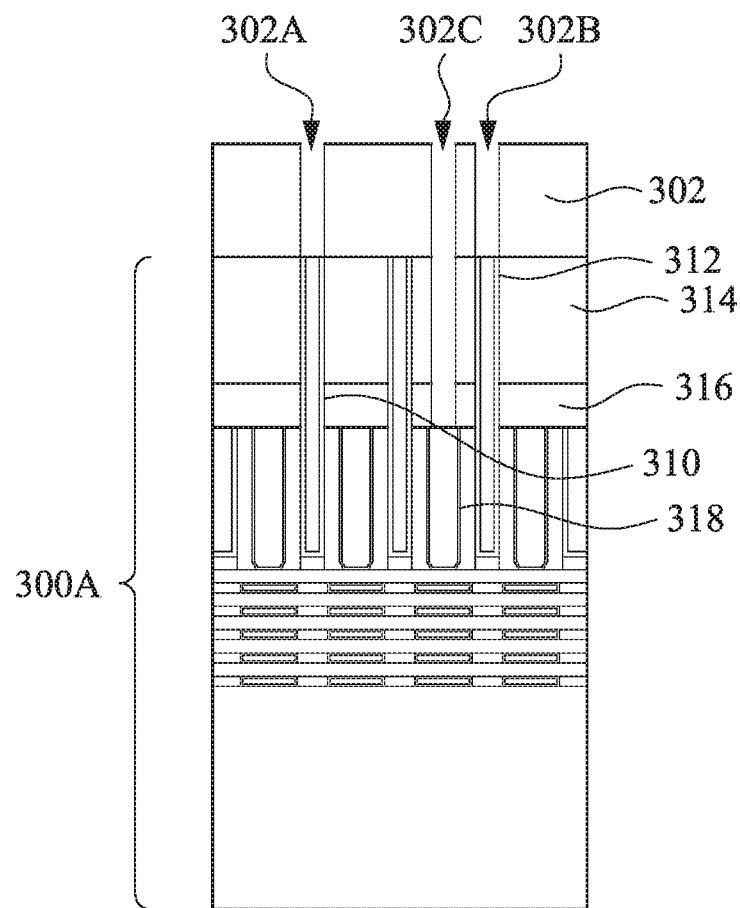
FIG. 3E to FIG. 3J exemplarily illustrate cross-sectional views of intermediate stages in the formation of another integrated semiconductor device viewed along a direction of the B2-B2' line in accordance with some embodiments of the present disclosure.

Referring to FIG. 3E, openings 302A, 302B and 302C are formed in an ILD layer 302 that is over a lower semiconductor device 300A. In some embodiments, as shown in FIG. 3E, the lower semiconductor device 300A may include a FinFET structure and is similar to the lower semiconductor device 200A shown in FIG. 2A, and intermediate stages in the formation of the lower semiconductor device 300A are assimilate to those shown in FIG. 2J to FIG. 2N, and thus detailed descriptions of the lower semiconductor device 300A are not described again herein. In various embodiments, the lower semiconductor device 300A may include a planar FET, a GAA transistor structure and/or any other suitable structure.

As shown in FIG. 3E, the openings 302A and 302B are formed through the ILD layer 302 to respectively expose conductive plugs 310 and 312 that are in the lower semiconductor device 300A, and the opening 302C is formed through the ILD layer 302 and the ILD layer 314 and the etch stop layer 316 of the lower semiconductor device 300A to expose a gate 318 of the lower semiconductor device 300A. In some embodiments, for example, a photoresist layer (not shown) is deposited on the ILD layer 302 and is subsequently patterned by utilizing photolithography techniques to form a photoresist mask. After the photoresist mask is formed, an etching processes, such an anisotropic dry etching process or the like, may be performed to etch portions of the ILD layer 302 vertically uncovered by the photoresist mask, so as to form the openings 302A and 302B. Then, one or more further etching processes, such an anisotropic dry etching process or the like, may be performed to etch portions of the ILD layer 314 and the etch stop layer 316 vertically uncovered by the photoresist mask, so as to form the opening 302C. Subsequently, the photoresist mask may be removed be performing, for example, an ashing process and/or a wet etching process.

Figure 3F:
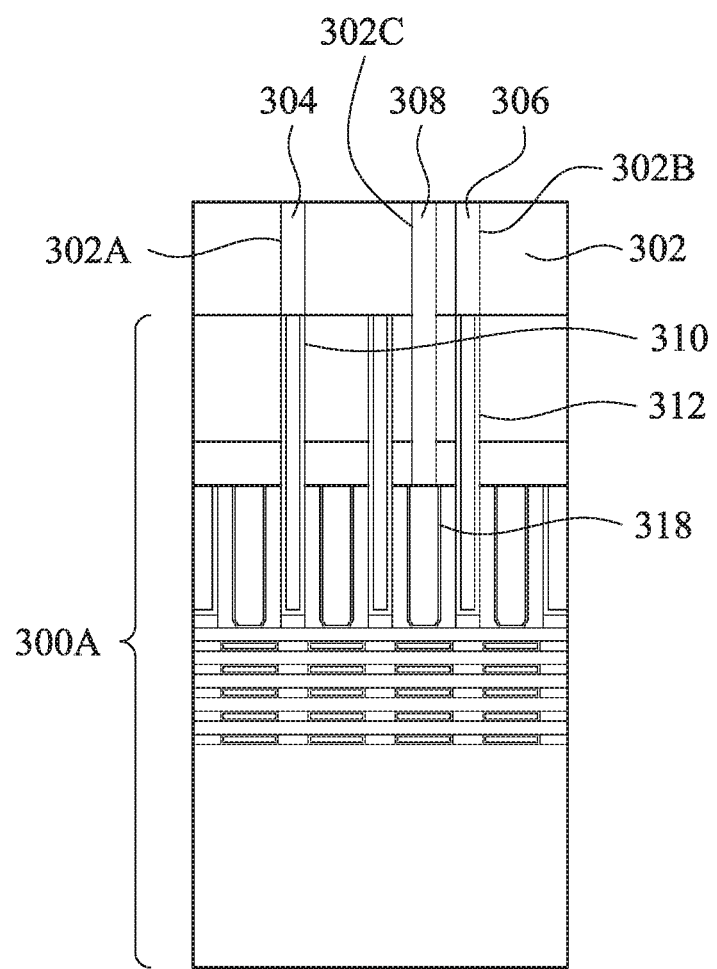

Referring to FIG. 3F, conductive plugs 304, 306 and 308 are formed respectively filling the openings 302A, 302B and 302C to respectively contact the conductive plugs 310 and 312 and the gate 318. The conductive plugs 304, 306 and 308 may be formed from gold, silver, copper, tungsten, aluminum, nickel, combinations thereof, a metal alloy, or the like, and may be formed by performing a process such as ALD, CVD, PVD, or the like. A further planarization process, such as CMP, may be performed to remove excessing portions of the conductive plugs 304, 306 and 308 above a top surface of the ILD layer 302. In some embodiments, the conductive plugs 304, 306 and 308 further include a liner (not shown) which is formed conformal to bottoms and sidewalls of the openings and may be similar to the liner 256 in FIG. 2N, and therefore details of the liner is not described herein.

Figure 3G:
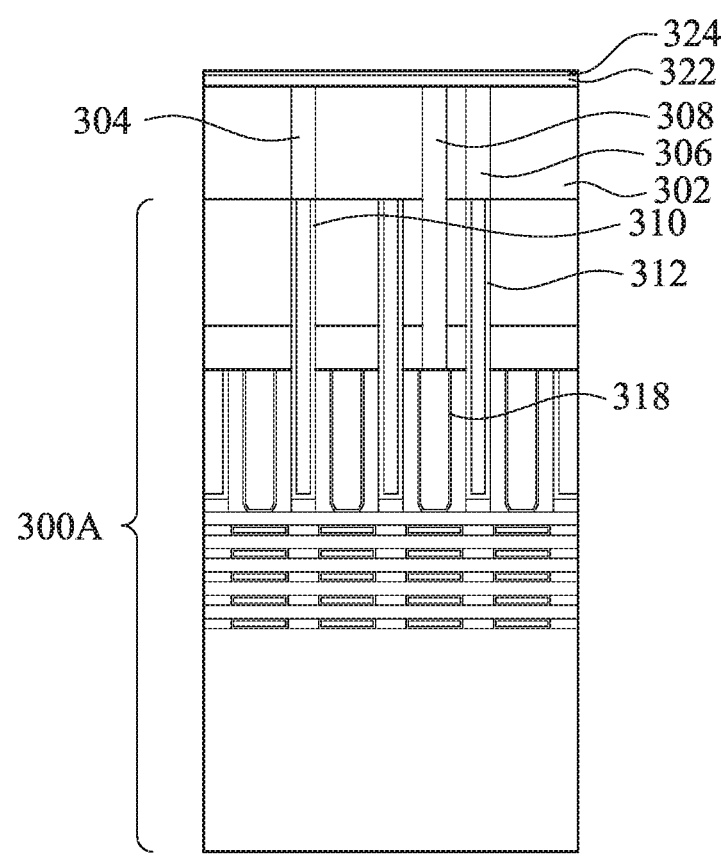

Referring to FIG. 3G, a metal layer 322 is formed over the ILD layer 302 and the conductive plugs 304, 306 and 308, and subsequently a dielectric layer 324 is formed over the metal layer 322. The metal layer 322 may have a thickness ranging from about 10 nm to about 20 nm and may be formed from a metallic material such as titanium, tantalum, tungsten, aluminum, molybdenum, platinum and hafnium, a metal silicide material (such as titanium silicide, tantalum silicide, tungsten silicate, molybdenum silicate, nickel silicide and cobalt silicide), a metal nitride material (such as titanium nitride, tantalum nitride, tungsten nitride, molybdenum silicate, nickel nitride and cobalt nitride), silicided metal nitride (such as titanium silicon nitride, tantalum silicon nitride and tungsten silicon nitride), refractory metals, polysilicon, combinations thereof, and/or another suitable material. The metal layer 322 may be formed by performing a process, such as PVD, ALD, electro-chemical plating, electroless plating, combinations thereof, or another suitable process.

The dielectric layer 324 may be formed from a dielectric material such as, but not limited to, silicon oxide, silicon nitride, silicon oxynitride, hafnium oxide, tantalum oxide, hafnium silicon oxide, hafnium silicon oxynitride, hafnium tantalum oxide, hafnium titanium oxide, hafnium zirconium oxide, zirconium silicate, zirconium aluminate, tin oxide, zirconium oxide, titanium oxide, aluminum oxide, high-k dielectric, combinations thereof, and/or another suitable material. The dielectric layer 324 may have a thickness ranging from about 1 nm to about 5 nm and may be formed by performing a process, such as CVD, PECVD, HDPCVD, ALD, spin-on coating, sputtering, combinations thereof, or another suitable process.

Figure 3H:
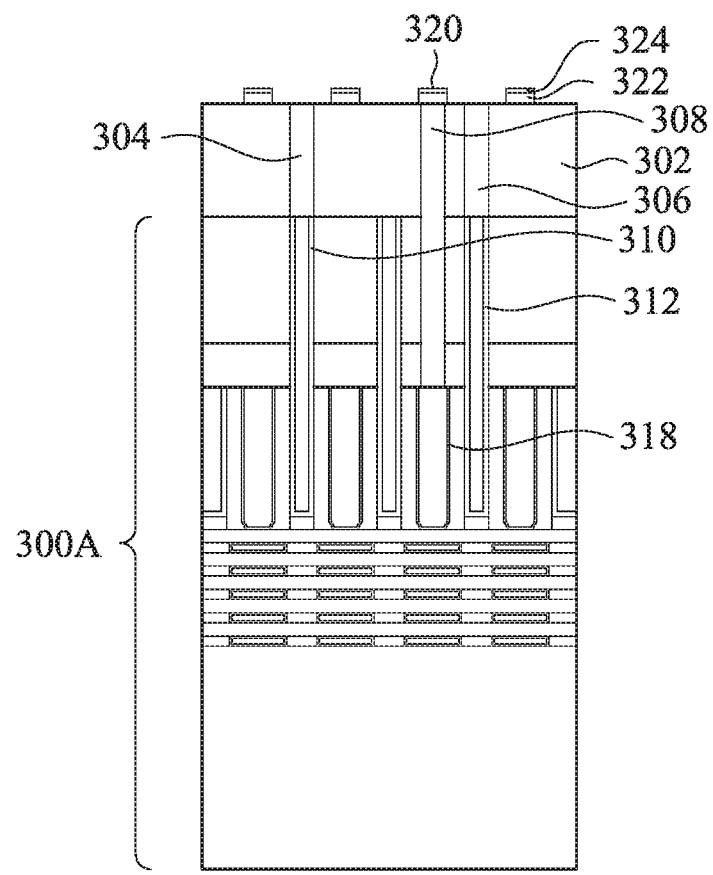

Referring to FIG. 3H, the metal layer 322 and the dielectric layer 324 are patterned to form gate stacks 320. In some embodiments, for example, a photoresist layer (not shown) is deposited on the dielectric layer 324 and is subsequently patterned by utilizing photolithography techniques to form a photoresist mask. The gate stacks 320 may be formed by performing one or more etching processes. For example, the dielectric layer 324 may be etched by performing a wet etching process, and then the metal layer 322 may be etched by performing a dry etching process. However, other suitable etching processes may be used to etch the metal layer 322 and/or the dielectric layer 324. Subsequently, the photoresist mask may be removed be performing, for example, an ashing process and/or a wet etching process. In this case, as shown in FIG. 3H, after the photoresist mask is removed, top surfaces of the conductive plugs 304 and 306 are exposed, while the conductive plug 308 is covered by one of the gate stacks 320.

Figure 3I:
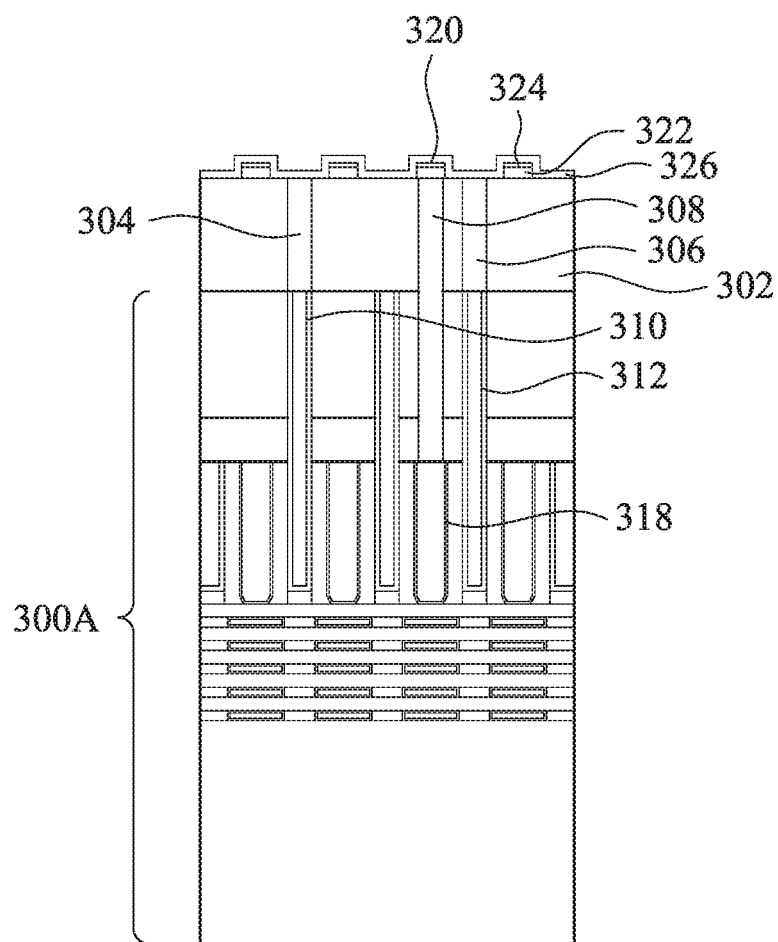

Referring to FIG. 3I, a 2D material layer 326 is formed over the gate stacks 320, the ILD layer 302 and the conductive plugs 304, 306 and 308. In some embodiments, the 2D material layer 326 is a monolayer that is formed from, for example, graphene, bismuth, hexagonal form boron nitride (h-BN), molybdenum sulfide, molybdenum selenide, tungsten, sulfide tungsten selenide, tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide, indium selenide, and/or the like. In some other embodiments, the 2D material layer 326 is formed from a ternary 2D material, such as $WSe_{2(1-x)}Te_{2x}$, (where x is in a range between 0 and 1), $Ta_2NiS_5$ or $ZnIn_2S_4$, a hybridized 2D material, such as a composition of boron nitride and graphene or a composition of molybdenum sulfide and rubrene. The 2D material layer 326 may have a thickness ranging from about 10 angstroms to about 50 angstroms and may be formed by performing a process, such as CVD, ALD, low thermal evaporation, injecting, wafer scale transfer, or another suitable process operated at a temperature lower than 400° C., depending on the material selected for the 2D material layer 326. In some alternative embodiments, multiple 2D material layers with the same or different 2D materials are formed over the gate stacks 320, the ILD layer 302 and the conductive plugs 304, 306 and 308.

Figure 3J:
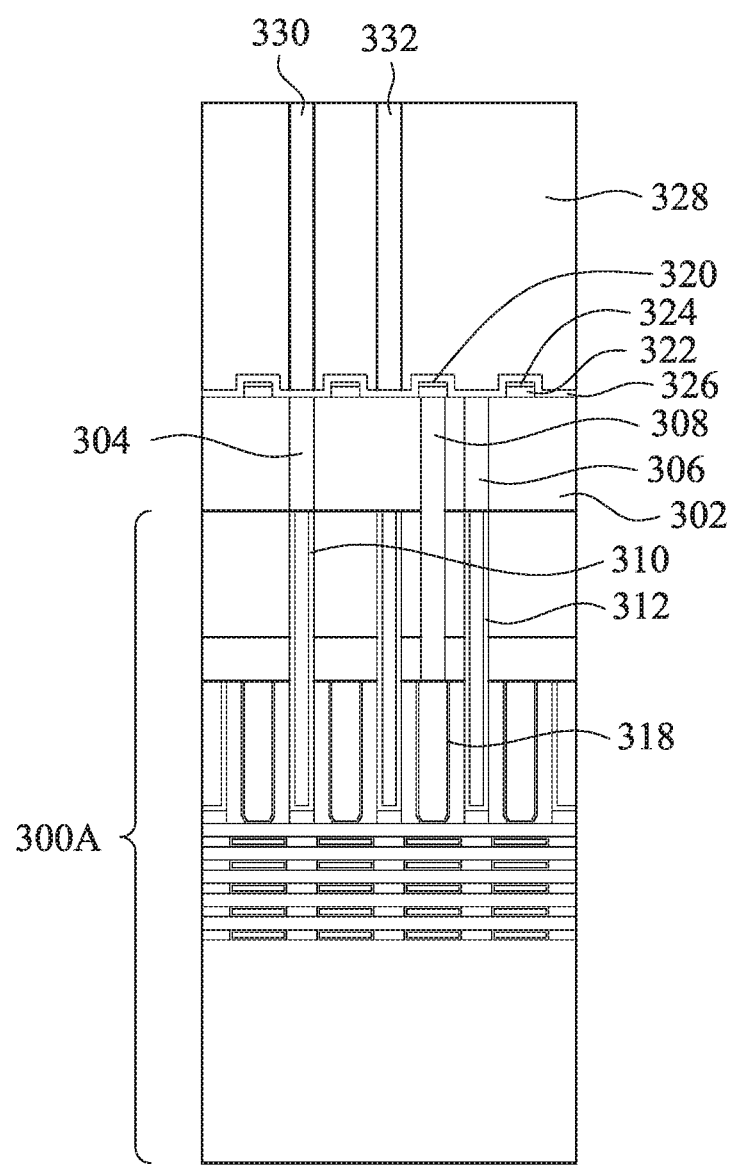

Referring to FIG. 3J, an inter-metal dielectric (IMD) layer 328 is formed over the 2D material layer 326. In some embodiments, the IMD layer 328 is formed from a dielectric material, such as silicon oxide or another suitable low-k dielectric material. Examples of a low-k dielectric material for the IMD layer 328 may include, but is not limited to, FSG, carbon doped silicon oxide, amorphous fluorinated carbon, parylene, BCB or polyimide. The IMD layer 328 may be formed by performing a process such as CVD, PVD, ALD, spin-on coating, or another suitable process. A further planarization process, such as CMP, may be performed to planarize the IMD layer 328.

As shown in FIG. 3J, the IMD layer 328 also includes conductive vias 330 and 332 which are formed therethrough to contact the 2D material layer 326. In some embodiments, for example, a photoresist layer (not shown) is deposited on the IMD layer 328 and is subsequently patterned by utilizing photolithography techniques to form a photoresist mask. After the photoresist mask is formed, one or more etching processes, such an anisotropic dry etching process or the like, may be performed to etch portions of the IMD layer 328 vertically uncovered by the photoresist mask, so as to form openings in the IMD layer 328. Subsequently, the photoresist mask may be removed be performing, for example, an ashing process and/or a wet etching process.

The conductive vias 330 and 332 are formed respectively filling the openings in the IMD layer 328. The conductive vias 330 and 332 may be formed from gold, silver, copper, tungsten, aluminum, nickel, combinations thereof, a metal alloy, or the like, and may be formed by performing a process such as ALD, CVD, PVD, or the like. A further planarization process, such as CMP, may be performed to remove excessing portions of the conductive vias 330 and 332 above a top surface of the IMD layer 328.

In accordance with some embodiments, an integrated semiconductor device includes a first semiconductor device, an ILD layer and a second semiconductor device. The first semiconductor device has a first transistor structure. The ILD layer is over the first semiconductor device. A thickness of the ILD layer is in a range substantially from 10 nm to 100 nm. The second semiconductor device has a second transistor structure and has a 2D material layer formed over the ILD layer as a channel layer of the second transistor structure.

In some embodiments, the 2D material layer includes graphene, bismuth, hexagonal form boron nitride (h-BN), molybdenum sulfide, molybdenum selenide, tungsten sulfide or tungsten selenide.

In some embodiments, the 2D material layer includes tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide or indium selenide.

In some embodiments, the 2D material layer includes at least one of ternary 2D material and hybridized 2D material.

In some embodiments, the ternary 2D material layer includes $WSe_{2(1-x)}Te_{2x}$, $Ta_2NiS_5$ or $ZnIn_2S_4$, where x is in a range between 0 and 1.

In some embodiments, the hybridized 2D material layer includes a composition of boron nitride and graphene or a composition of molybdenum sulfide and rubrene.

In some embodiments, a thickness of the 2D material layer is in a range substantially from 10 angstroms to 50 angstroms.

In some embodiments, the second transistor structure further includes a source electrode, a drain electrode, a gate dielectric layer and a gate electrode. The source electrode and the drain electrode are respectively at two opposite ends of the 2D material layer. The gate dielectric layer is over the 2D material layer, the source electrode and the drain electrode. The gate electrode is over the gate dielectric layer and laterally between the source electrode and the drain electrode.

In some embodiments, the second semiconductor device further includes a gate stack, a first conductive plug, a second conductive plug and a conductive via. The gate stack is over the ILD layer and is surrounded by the 2D material layer. The first conductive plug is through the ILD layer and contacts the 2D material layer and a gate of the first transistor structure. The second conductive plug is through the ILD layer and contacts the 2D material layer and a drain of the first transistor structure. The conductive via contacts the 2D material layer. The second conductive plug and the conductive via are respectively at opposite sides laterally relative to the gate stack.

In some embodiments, the first transistor structure is a FinFET structure or a planar FET structure.

In accordance with certain embodiments, a method of fabricating an integrated semiconductor device includes the following steps. A semiconductor device with a first transistor structure is provided. An ILD layer is formed over the semiconductor device. A thickness of the ILD layer is in a range substantially from 10 nm to 100 nm. A 2D material layer is formed over the ILD layer. The 2D material layer is patterned to form a channel layer of a second transistor structure. A source electrode and a drain electrode of the second transistor structure are formed respectively at two opposite ends of the patterned 2D material layer. A gate dielectric layer of the second transistor structure is formed over the patterned 2D material layer, the source electrode and the drain electrode. A gate electrode of the second transistor structure is formed over the gate dielectric layer and laterally between the source electrode and the drain electrode.

In some embodiments, the 2D material layer is formed from graphene, bismuth, h-BN, molybdenum sulfide, molybdenum selenide, tungsten sulfide or tungsten selenide.

In some embodiments, the 2D material layer is formed from tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide or indium selenide.

In some embodiments, the 2D material layer is formed from at least one of ternary 2D material and hybridized 2D material.

In some embodiments, the 2D material layer is formed having a thickness in a range substantially from 10 angstroms to 50 angstroms.

In accordance with some embodiments, a method of fabricating an integrated semiconductor device includes the following steps. A semiconductor device with a first transistor structure is provided. An ILD layer is formed over the semiconductor device. A thickness of the ILD layer is in a range substantially from 10 nm to 100 nm. A first conductive plug is formed through the ILD layer and contacting a gate of the first transistor structure. A second conductive plug is formed through the ILD layer and contacting a drain of the first transistor structure. A gate stack is formed over the ILD layer and contacting the first conductive plug. A 2D material layer is formed over the gate stack and the ILD layer and contacting the second conductive plug as a channel layer of a second transistor structure. A conductive via is formed contacting the 2D material layer. The second conductive plug and the conductive via are respectively at opposite sides laterally relative to the gate stack.

In some embodiments, the 2D material layer is formed from graphene, bismuth, h-BN, molybdenum sulfide, molybdenum selenide, tungsten sulfide or tungsten selenide.

In some embodiments, the 2D material layer is formed from tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide or indium selenide.

In some embodiments, the 2D material layer is formed from at least one of ternary 2D material and hybridized 2D material.

In some embodiments, the 2D material layer is formed having a thickness in a range substantially from 10 angstroms to 50 angstroms.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating an integrated semiconductor device, the method comprising:
    forming an inter-layer dielectric (ILD) layer over a semiconductor device that includes a first transistor structure;
    etching a first via hole in the ILD layer to expose a gate of the first transistor structure and a second via hole in the ILD layer to expose a source/drain contact plug of the first transistor structure;
    forming a first conductive plug in the first via hole and a second conductive plug in the second via hole;
    forming a gate stack over and electrically connected to the first conductive plug;
    forming a two-dimensional (2D) material layer having a first portion over the gate stack, a second portion over the ILD layer, and a third portion over and electrically connected to the second conductive plug; and
    forming a third conductive plug over and electrically connected to the 2D material layer, wherein the second conductive plug and the third conductive plug are spaced apart in a lateral direction substantially parallel with a top surface of the ILD layer, and the gate stack is between, in the lateral direction, the second conductive plug and the third conductive plug.

2. The method of claim 1, wherein the 2D material layer comprises graphene, bismuth, hexagonal form boron nitride (h-BN), molybdenum sulfide, molybdenum selenide, tungsten sulfide or tungsten selenide.

3. The method of claim 1, wherein the 2D material layer comprises tin selenide, platinum sulfide, platinum selenide, cadmium sulfide, cadmium selenide, palladium selenide, rhenium sulfide, rhenium selenide, titanium selenide, molybdenum telluride, tungsten telluride, lead iodide, boron phosphide, gallium selenide or indium selenide.

4. The method of claim 1, wherein the 2D material layer comprises a ternary 2D material, a hybridized 2D material, or combinations thereof.

5. The method of claim 4, wherein the ternary 2D material comprises $WSe_{2(1-x)}Te_{2x}$, $Ta_2NiS_5$ or $ZnIn_2S_4$, where x is in a range between 0 and 1.

6. The method of claim 4, wherein the hybridized 2D material comprises a composition of boron nitride and graphene or a composition of molybdenum sulfide and rubrene.

7. The method of claim 1, wherein forming the 2D material layer is performed such that a thickness of the 2D material layer in a range substantially from 10 angstroms to 50 angstroms.

8. A method comprising:
    forming a first transistor over a substrate;
    depositing an inter-layer dielectric (ILD) layer over the first transistor;
    depositing a gate conductive layer over the ILD layer;
    depositing a gate dielectric layer over the gate conductive layer;
    etching the gate dielectric layer and the gate conductive layer to form a gate stack; and
    depositing a 2D material layer that has a first portion extending along a top surface and sidewalls of the gate stack and a second portion extending along a top surface of the ILD layer.

9. The method of claim 8, further comprising:
    forming an inter-metal dielectric (IMD) layer over the 2D material layer; and
    forming conductive vias extending through the IMD layer to the 2D material layer.

10. The method of claim 9, wherein the conductive vias non-overlap the gate stack.

11. The method of claim 8, further comprising:
    prior to forming the gate conductive layer, forming a first conductive plug and a second conductive plug extending through the ILD layer,
    wherein etching the gate dielectric layer and the gate conductive layer is performed such that the gate stack overlaps the first conductive plug.

12. The method of claim 11, wherein depositing the 2D material layer is performed such that the 2D material layer is in contact with the second conductive plug.

13. The method of claim 11, further comprising:
    forming an inter-metal dielectric (IMD) layer over the 2D material layer; and
    forming a conductive via extending through the IMD layer to the 2D material layer, the conductive via overlapping the second conductive plug.

14. A method comprising:
    forming a first inter-layer dielectric (ILD) layer over a semiconductor device that includes a first transistor structure;
    forming a conductive plug in the first ILD layer and electrically connected to the first transistor structure;
    forming a gate structure over the first ILD layer after forming the conductive plug;
    depositing a two-dimensional (2D) material layer over the gate structure and the conductive plug; and
    forming a conductive via over the 2D material layer.

15. The method of claim 14, wherein the gate structure is formed directly on the conductive plug and a gate of the first transistor structure.

16. The method of claim 14, wherein a bottom surface of the conductive via is lower than a top surface of the gate structure.

17. The method of claim 14, wherein a portion of the 2D material layer is directly between the conductive via and the conductive plug.

18. The method of claim 14, wherein the 2D material layer comprises $WSe_{2(1-x)}Te_{2x}$, $Ta_2NiS_5$ or $ZnIn_2S_4$, where x is in a range between 0 and 1.

19. The method of claim 14, wherein forming the gate structure over the first ILD layer comprises:
- depositing a metal layer over the first ILD layer such that the metal layer is in contact with the conductive plug;
- depositing a dielectric layer over the metal layer; and
- patterning the dielectric layer and the metal layer to form the gate structure.

20. The method of claim 14, wherein depositing the 2D material layer is such that the 2D material layer is in contact with a sidewall of the gate structure.

\* \* \* \* \*